US012489951B2

(12) United States Patent
Kim et al.

(10) Patent No.: US 12,489,951 B2
(45) Date of Patent: Dec. 2, 2025

(54) ELECTRONIC APPARATUS AND OPERATING METHOD OF ELECTRONIC APPARATUS

(71) Applicant: Samsung Electronics Co., Ltd., Suwon-si (KR)

(72) Inventors: Heejin Kim, Suwon-si (KR); Ochae Kwon, Suwon-si (KR); Myoungwoo Nam, Suwon-si (KR); Inje Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/505,589

(22) Filed: Nov. 9, 2023

(65) Prior Publication Data

US 2024/0080530 A1  Mar. 7, 2024

Related U.S. Application Data

(63) Continuation-in-part of application No. PCT/KR2022/007078, filed on May 17, 2022.

(30) Foreign Application Priority Data

May 18, 2021 (KR) .................. 10-2021-0063865

(51) Int. Cl.
*H04N 21/472* (2011.01)
*H04N 21/431* (2011.01)
(Continued)

(52) U.S. Cl.
CPC ... *H04N 21/47217* (2013.01); *H04N 21/4316* (2013.01); *H04N 21/4532* (2013.01); *H04N 21/466* (2013.01); *H04N 21/8173* (2013.01)

(58) Field of Classification Search
None
See application file for complete search history.

(56) References Cited

U.S. PATENT DOCUMENTS

| 7,721,032 B2 | 5/2010 | Bushell et al. |
| 7,941,582 B2 | 5/2011 | Bushell et al. |
| (Continued) |

FOREIGN PATENT DOCUMENTS

| JP | 2013-020197 A | 1/2013 |
| JP | 2014-090265 A | 5/2014 |
| (Continued) |

OTHER PUBLICATIONS

International Search Report dated Aug. 23, 2022, issued in International Patent Application No. PCT/KR2022/007078.
(Continued)

*Primary Examiner* — James R Marandi
(74) *Attorney, Agent, or Firm* — Jefferson IP Law, LLP

(57) ABSTRACT

An electronic device is provided. The electronic device includes a display, a speaker, a memory, and a processor operatively connected with the display, the speaker, and the memory. The memory stores one or more instructions, when executed, causing the processor to pause playback of first content depending on identifying occurrence of an event associated with second content while playing the first content and execute an operation corresponding to the event, determine whether to resume playing the first content based on a duration of the event, and resume playing the first content depending on identifying end of the event based on determining to resume playing the first content.

18 Claims, 15 Drawing Sheets

(51) Int. Cl.
    *H04N 21/45*     (2011.01)
    *H04N 21/466*     (2011.01)
    *H04N 21/81*     (2011.01)

(56) References Cited

U.S. PATENT DOCUMENTS

| | | |
|---|---|---|
| 8,140,974 B2 | 3/2012 | Hayter et al. |
| 8,755,921 B2 | 6/2014 | Hamilton et al. |
| 8,908,879 B2 | 12/2014 | Bates et al. |
| 9,077,763 B2 | 7/2015 | Simongini et al. |
| 9,996,148 B1 | 6/2018 | Deramat et al. |
| 10,338,881 B2 | 7/2019 | Bates et al. |
| 10,732,923 B2 | 8/2020 | Hayasaka |
| 10,951,933 B2 | 3/2021 | Delaney et al. |
| 10,956,118 B2 | 3/2021 | Bates et al. |
| 11,269,588 B2 | 3/2022 | Lee et al. |
| 2011/0320612 A1 | 12/2011 | Oka et al. |
| 2012/0011545 A1* | 1/2012 | Doets ............ H04N 21/8153 725/38 |
| 2012/0029672 A1 | 2/2012 | Hamilton et al. |
| 2015/0256904 A1* | 9/2015 | Chi ............ H04N 21/23614 725/113 |
| 2017/0359613 A1 | 12/2017 | Hedhli et al. |
| 2018/0124450 A1* | 5/2018 | Hwang ............ H04N 21/43615 |

FOREIGN PATENT DOCUMENTS

| | | |
|---|---|---|
| JP | 2017-028685 A | 2/2017 |
| KR | 10-2014-0065121 A | 5/2014 |
| KR | 10-2017-0084046 A | 7/2017 |
| KR | 10-2021-0009511 A | 1/2021 |

OTHER PUBLICATIONS

Korean Office Action Office Action dated Aug. 27, 2025, issued in Korean Application No. 10-2021-0063865.

* cited by examiner

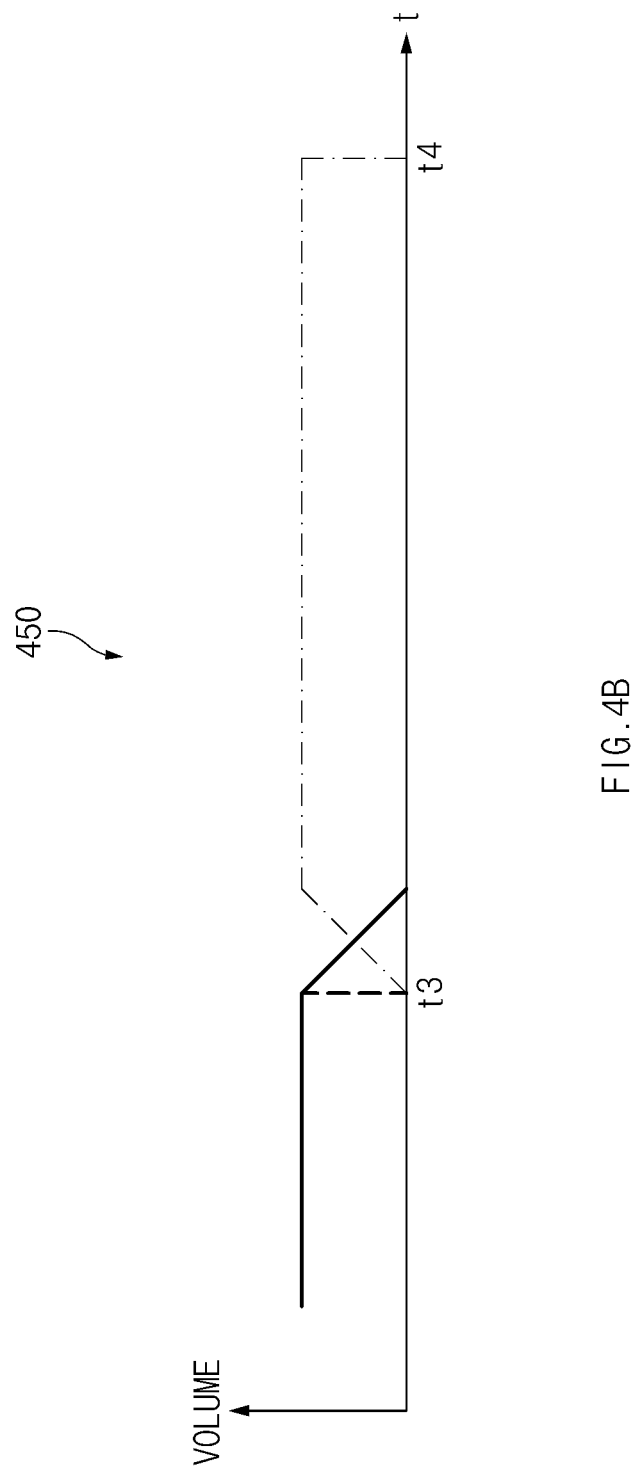

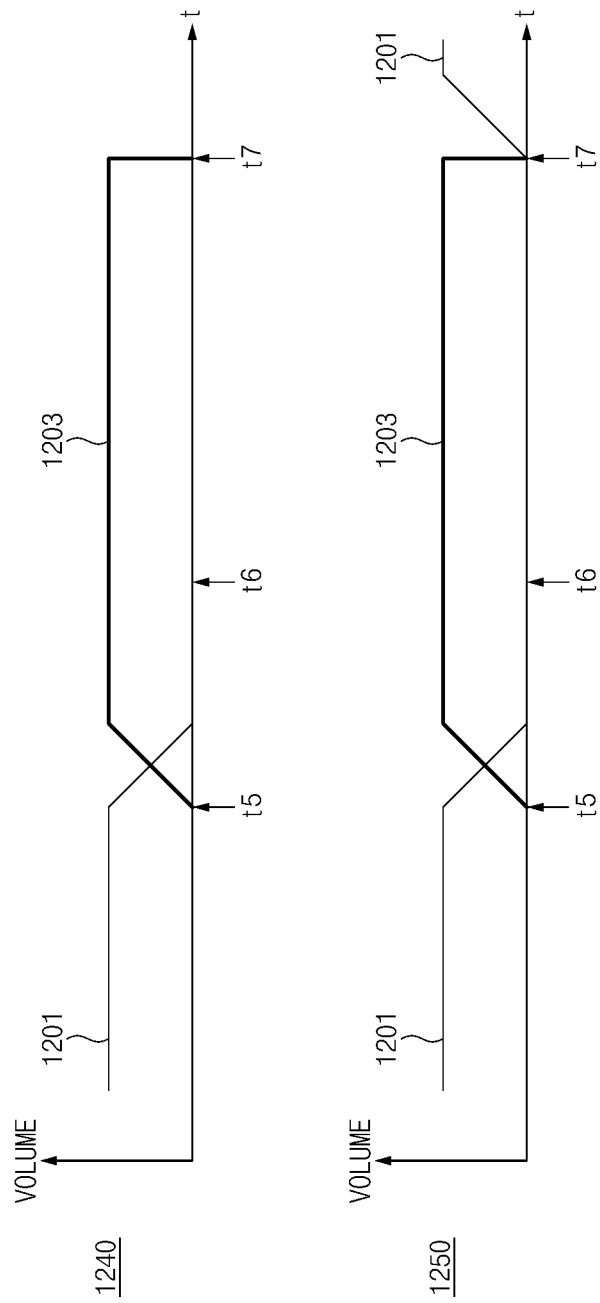

ELECTRONIC APPARATUS AND OPERATING METHOD OF ELECTRONIC APPARATUS

CROSS-REFERENCE TO RELATED APPLICATION(S)

This application is a continuation-in-part application, claiming priority under § 365(c), of an International application No. PCT/KR2022/007078, filed on May 17, 2022, which is based on and claims the benefit of a Korean patent application number 10-2021-0063865, filed on May 18, 2021, in the Korean Intellectual Property Office, the disclosure of which is incorporated by reference herein in its entirety.

BACKGROUND

1. Field

The disclosure relates to an electronic device and method of operating the electronic device. More particularly, the disclosure relates to a method for providing previously requested content and subsequently requested content depending on receiving a request of a user for the other content while providing the content depending to the request of the user.

2. Description of Related Art

An electronic device may provide content through its speaker and its display. Furthermore, the electronic device may perform sound recording or video recording to generate content, using its microphone and its camera.

The electronic device may determine a method for providing previously requested content and subsequently requested content depending on receiving a request of a user for the other content while providing the content depending to the request of the user.

The above information is presented as background information only to assist with an understanding of the disclosure. No determination has been made, and no assertion is made, as to whether any of the above might be applicable as prior art with regard to the disclosure.

SUMMARY

The electronic device stops playing previously requested content depending on receiving a request of a user for another content while playing the content depending on the request of the user and processes a task associated with the subsequently requested content. The electronic device needs to resume playing the previously requested content after completing the processing of the task associated with the subsequently requested content. Furthermore, the electronic device needs to resume playing the previously requested content based on a processing time of the task associated with the subsequently requested content after ending the processing of the task associated with the subsequently requested content.

Aspects of the disclosure are to address at least the above-mentioned problems and/or disadvantages and to provide at least the advantages described below. Accordingly, an aspect of the disclosure is to provide an electronic device and a method of operating the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a display, a speaker, a memory, and a processor operatively connected with the display, the speaker, and the memory. The memory stores one or more instructions, when executed, causing the processor to pause playback of first content depending on identifying occurrence of an event associated with second content while playing the first content and execute an operation corresponding to the event, determines whether to resume playing the first content based on a duration of the event, and resumes playing the first content depending on identifying end of the event based on determining to resume playing the first content.

In accordance with another aspect of the disclosure, a method of operating an electronic device is provided. The method includes pausing playback of first content depending on identifying occurrence of an event associated with second content while playing the first content and executing an operation corresponding to the event, determining whether to resume playing the first content based on a duration of the event, and resuming playing the first content depending on identifying end of the event based on determining to resume playing the first content.

According to various embodiments of the disclosure, the electronic device and the operating method thereof are provided to process a task associated with subsequently requested content according to the request of the user while playing previously requested content and determine whether to resume playing the previously requested content based on a processing time of the task associated with the subsequently requested content.

Furthermore, according to various embodiments of the disclosure, the electronic device and the operating method thereof are provided to process a task associated with subsequently requested content depending the request of the user while playing previously requested content and determine whether to resume playing the previously requested content based on properties (or a type) of the subsequently requested content.

Furthermore, according to various embodiments of the disclosure, the electronic device and the operating method thereof are provided to process a task associated with subsequently requested content depending on the request of the user while playing previously requested content and determine whether to resume playing the previously requested content to suit a usage situation of the user or an intention of the user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4B illustrates an operation of an electronic device according to an embodiment of the disclosure;

FIG. 12B illustrates an operation of playing second content alone in an electronic device according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
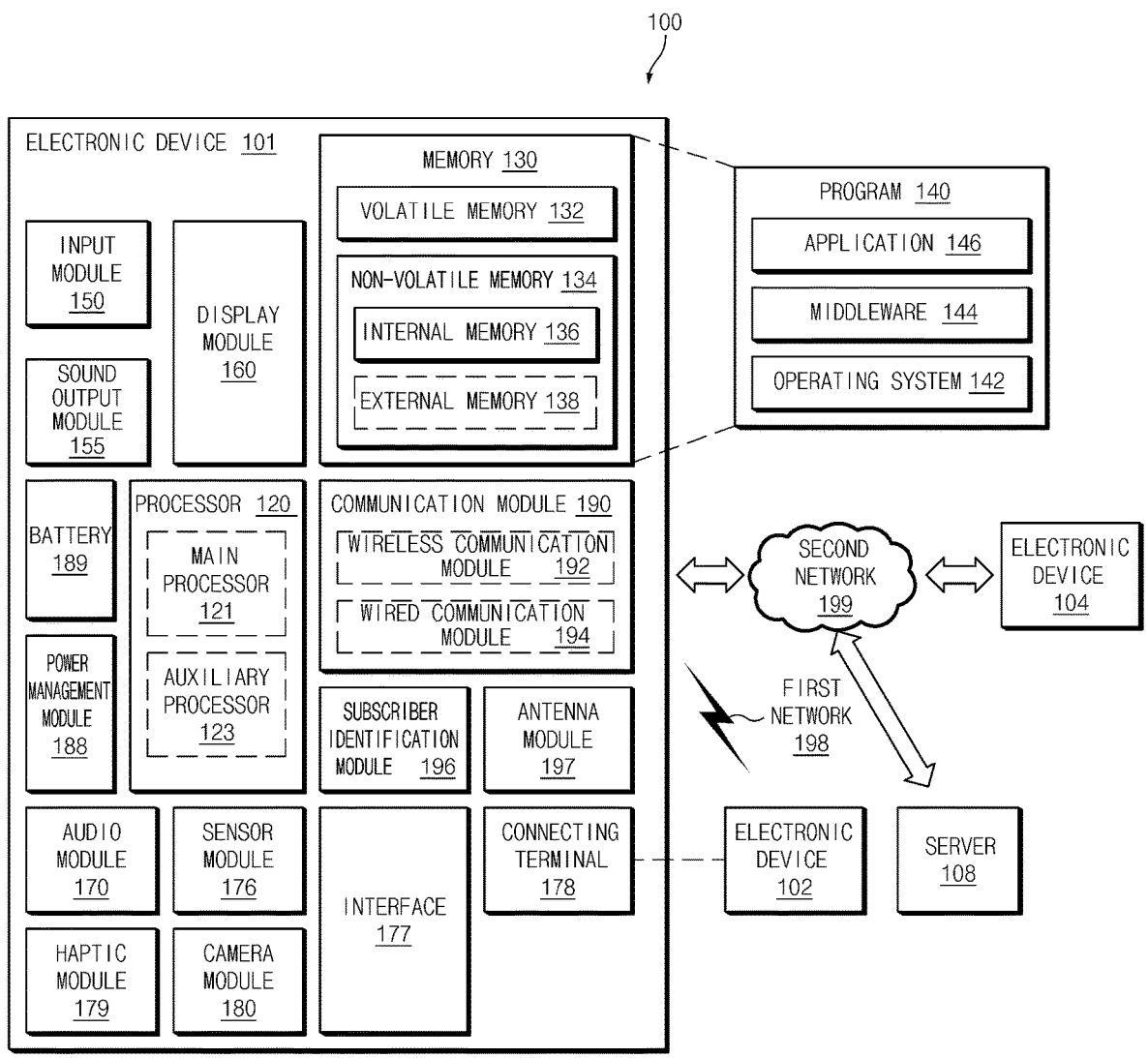
FIG. 1 is a block diagram illustrating an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
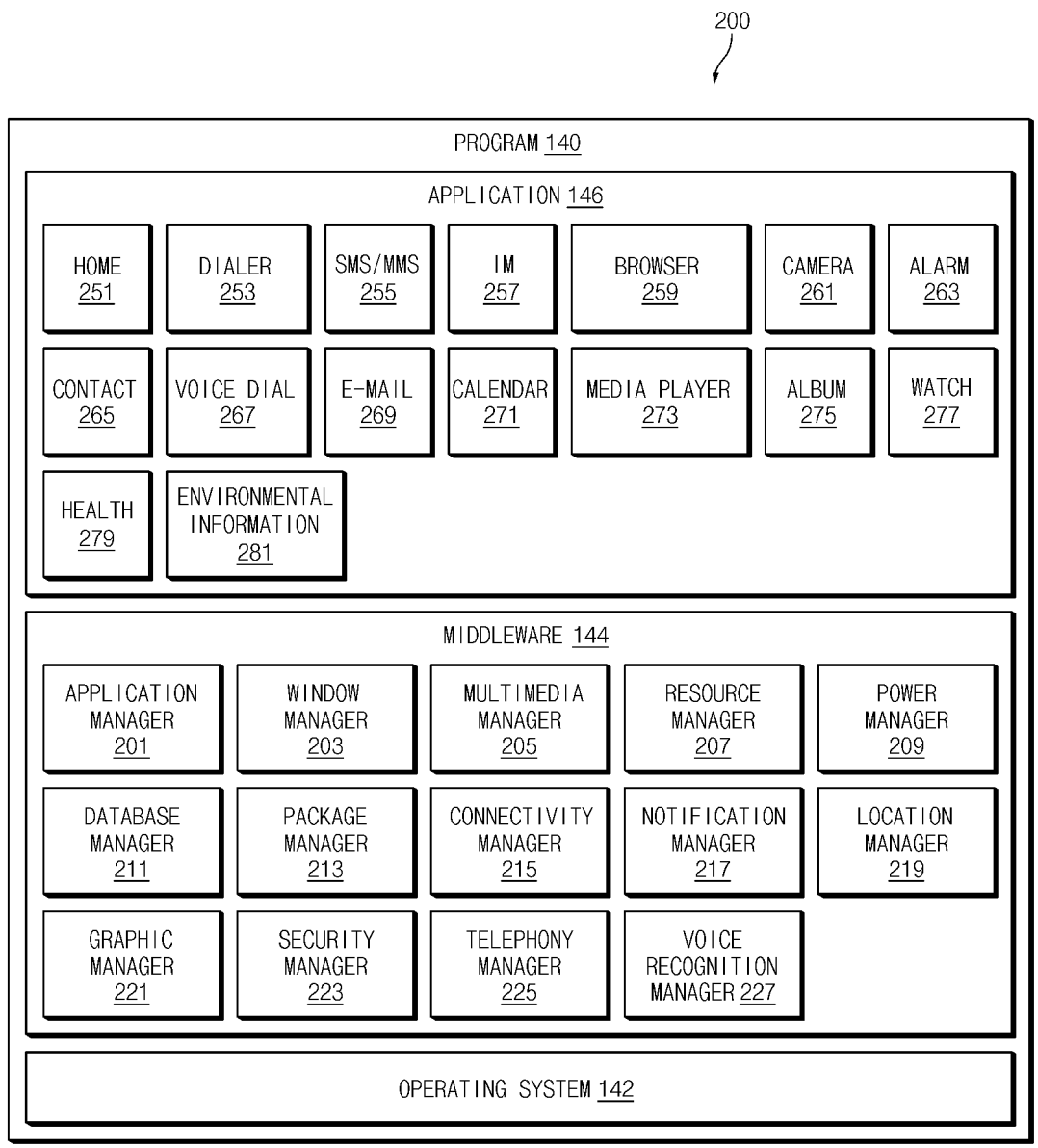
FIG. 2 is a block diagram illustrating a program according to an embodiment of the disclosure.

FIG. 2 is a block diagram 200 illustrating a program according to an embodiment of the disclosure.

Referring to FIG. 2, according to an embodiment of the disclosure, the program 140 may include an operating system (OS) 142 to control one or more resources of the electronic device 101, middleware 144, or an application 146 executable in the OS 142. The OS 142 may include, for example, Android™, iOS™ Windows™, Symbian™, Tizen™, or Bada™. At least part of the program 140, for example, may be pre-loaded on the electronic device 101 during manufacture, or may be downloaded from or updated by an external electronic device (e.g., the external electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment of the disclosure, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment of the disclosure, the middleware 244 may dynamically delete some existing components or add new components. According to an embodiment of the disclosure, at least part of the middleware 144 may be included as part of the OS 142 or may be implemented as another software separate from the OS 142.

The application 146 may include, for example, a home 251, a dialer 253, a short message service (SMS)/a multimedia messaging service (MMS) 255, an instant message (IM) 257, a browser 259, a camera 261, an alarm 263, a contact 265, voice recognition 267, an email 269, a calendar 271, a media player 273, an album 275, watch 277, health 279 (e.g., for measuring the degree of workout or biometric information, such as blood sugar), or environmental information 281 (e.g., for measuring air pressure, humidity, or temperature information) application. According to an embodiment of the disclosure, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Hereinafter, a description will be given of an operation of an electronic device according to an embodiment with reference to FIG. 3.

Figure 3:
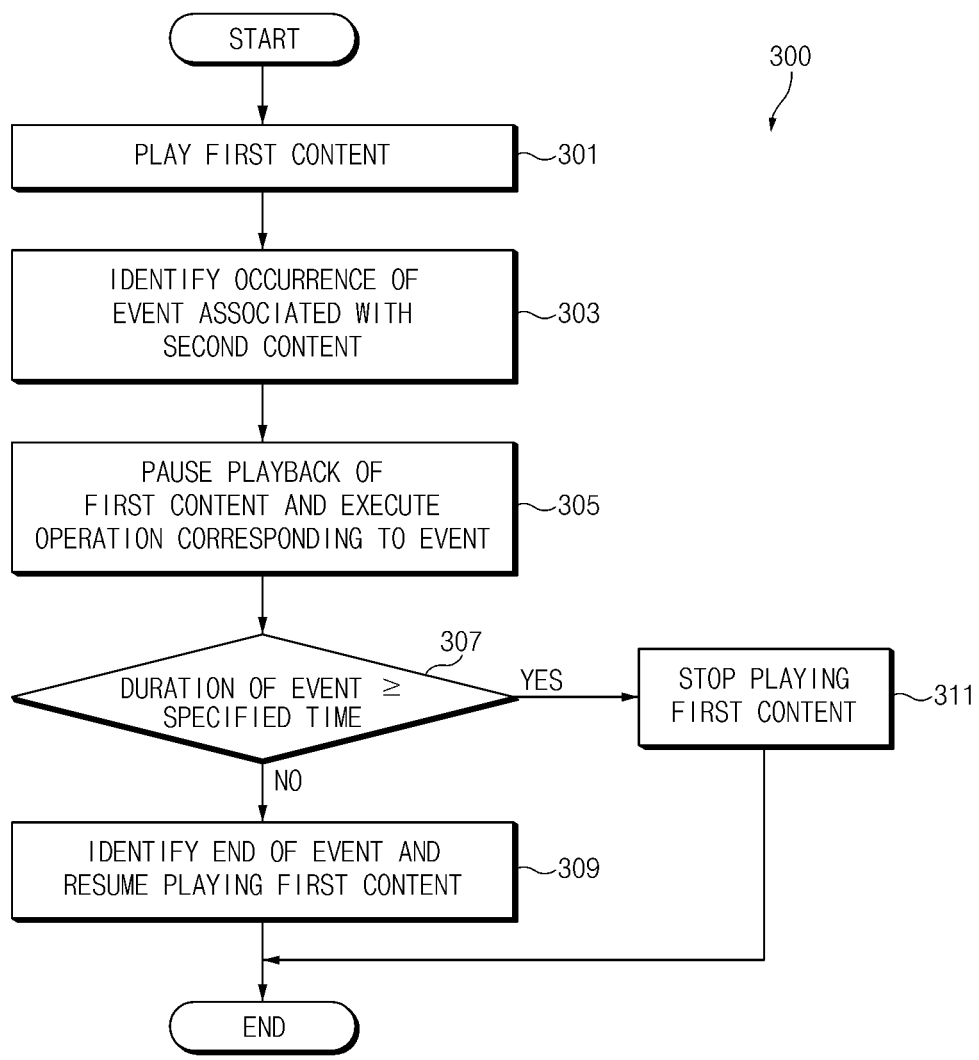
FIG. 3 is a flowchart illustrating an operation of an electronic device according to an embodiment of the disclosure.

FIG. 3 is a flowchart 300 of an electronic device according to an embodiment of the disclosure.

Referring to FIG. 3, operations of the electronic device, which will be described below, may be performed by an electronic device 101 of FIG. 1 or a processor 120 of the electronic device 101.

In operation 301, the electronic device may play first content. According to an embodiment of the disclosure, the first content may be media content. For example, the first content may include music or a video. According to an embodiment of the disclosure, the electronic device may include a display (e.g., the display module 160 of FIG. 1) and a speaker (e.g., the sound output module 155 of FIG. 1). According to an embodiment of the disclosure, the electronic device may play the first content by means of at least one of the display and the speaker. For example, the electronic device may display a screen of the first content on the display. For example, the electronic device may output a sound of the first content through the speaker. According to an embodiment of the disclosure, the electronic device may play the first content using a first application. For example, the first application may include an application capable of playing music or an application capable of playing a video.

In operation 303, the electronic device may identify occurrence of an event associated with second content. According to an embodiment of the disclosure, the electronic device may identify the occurrence of the event associated with the second content while playing the first content. According to an embodiment of the disclosure, the second content may be media content. For example, the second content may include music, a voice, or a video. According to an embodiment of the disclosure, the event associated with the second content may include playback of the second content or generation of the second content. According to an embodiment of the disclosure, the electronic device may play the second content depending on receiving a user input to play the second content using a second application and may identify the occurrence of the event associated with the second content as the second content is played. In this case, the second application may include an application capable of playing music or a voice or an application capable of playing a video. According to another embodiment of the disclosure, the electronic device may play the second content depending on receiving a user input to generate the second content using the second application and may identify the occurrence of the event associated with the second content as the second content is generated. In this case, the second application may include an application capable of recording a sound or an application capable of recording a video. For example, the user input to generate the second content may include a user input for executing a sound recording function or a video recording function of the second application.

In operation 305, the electronic device may pause the playback of the first content and may execute an operation corresponding to the event. According to an embodiment of the disclosure, the electronic device may pause the playback of the first content and may execute the operation corresponding to the event, depending on identifying the occurrence of the event associated with the second content while playing the first content. According to an embodiment of the disclosure, the operation corresponding to the event may include an operation of playing the second content or an operation of generating the second content. For example, the operation of generating the second content may be an operation of executing sound recording or video recording. According to an embodiment of the disclosure, the electronic device may pause the playback of the first content and may play the second content, depending on receiving the user input to play the second content while playing the first content. According to another embodiment of the disclosure, the electronic device may generate the second content depending on receiving the user input to generate the second content while playing the first content. For example, the electronic device may generate the sound-recorded or video-recorded second content depending on receiving a user input for executing a sound recording function or a video recording function of the second application different from the first application while playing the first content using the first application.

In operation 307, the electronic device may determine whether a duration of the event is greater than or equal to a specified time. According to an embodiment of the disclosure, the duration of the event may include a playback time of the second content or a generation time of the second content. According to an embodiment of the disclosure, the playback time of the second content may refer to a time from a time point when the electronic device starts to play the second content to a time point when the electronic device ends the playback of the second content. For example, when the electronic device plays a 10-second video which is the second content from beginning to end, the playback time of the second content may be 10 seconds. For another example, when the electronic device plays the 10-second video, which is the second content, for 5 seconds and ends the playback of the video based on a user input for scrolling a screen, the playback time of the second content may be 5 seconds. For another example, when the electronic device plays a 30-minute video, which is the second content, for 10 seconds and skips the video to play the last 10 seconds of the video and when it takes 3 seconds to skip the video, the playback time of the second content may be 23 seconds. According to an embodiment of the disclosure, the generation time of the second content may refer to a time taken for the electronic device to generate the second content, for example, a sound recording time or a video recording time.

According to an embodiment of the disclosure, the electronic device may set a specified time based on a content-related application usage pattern of a user of the electronic device. According to an embodiment of the disclosure, the electronic device may obtain time data corresponding to the duration of the event associated with the second content. According to an embodiment of the disclosure, the duration of the event associated with the second content may correspond to a time from a time point when the electronic device deviates from the first application for playing the first content and executes the operation corresponding to the event associated with the second content using the second application to a time point when the electronic device returns to the first application and resumes playing the first content. According to an embodiment of the disclosure, that the electronic device deviates from the first application may mean that the electronic device moves focus on the first application to another application, and that the electronic device returns to the first application may mean that the electronic device moves the focus on the other application to the first application. For example, the electronic device may display an execution screen of the focused application on the display. According to an embodiment of the disclosure, the electronic device may measure a time from a time point when deviating from the first application for playing the first content and executing the operation corresponding to the event associated with the second content (e.g., the playback of the second content) using the second application to a time point when returning to the first application and resuming playing the first content, thus obtaining time data. According to an embodiment of the disclosure, the electronic device may set the specified time based on the obtained time data. For example, the electronic device may calculate an average value of the obtained time data and may set the calculated average value to the specified time. For another example, the electronic device may calculate a minimum value and a maximum value of the obtained time data and may set a range of the calculated minimum value or more and the calculated maximum or less to a specified time range. In this case, the electronic device may determine whether the duration of the event belongs to the specified time range.

According to an embodiment of the disclosure, the electronic device may identify the first application for playing the first content and the second application for executing the operation corresponding to the event associated with the second content while playing the first content. According to an embodiment of the disclosure, the electronic device may set the specified time based on a combination of the identified first application and the identified second application. According to an embodiment of the disclosure, the electronic device may differently set the specified time based on the combination of the identified first application and the identified second application. According to an embodiment of the disclosure, the electronic device may differently set the specified time based on a type of the first and a type of the second application. For example, the electronic device may set the specified time to a first time in response to a combination in which the first application is a video playback application and the second application is a music playback application and may set the specified time to a second time in response to a combination in which the first application is the music playback application and the second application is the video playback application. According to an embodiment of the disclosure, the electronic device may differently set the specified time as each of the first application and the second application is a specific application. For example, the electronic device may set the specified time to the first time in response to a combination in which the first application is a first video playback application and the second application is a first music playback application and may set the specified time to the second time in response to a combination in which the first application is a second video playback application and the second application is a second music playback application.

According to an embodiment of the disclosure, the electronic device may predict a duration of the event associated with the second content according to a combination of the first application and the second application by means of machine learning by using the obtained time data as training data. According to an embodiment of the disclosure, the electronic device may set the predicted duration to the specified time.

According to another embodiment of the disclosure, the electronic device may set the specified time to a specific time (e.g., N seconds). For example, the electronic device may set an entered specific time to the specified time depending on receiving a user input for entering the specific time.

According to an embodiment of the disclosure, the electronic device may determine whether to resume playing the first content based on the duration of the event associated with the second content. According to an embodiment of the disclosure, the electronic device may determine whether to stop playing the first content based on the duration of the event associated with the second content. According to an embodiment of the disclosure, when determining that the duration of the event associated with the second content is greater than or equal to the specified time (operation 307—YES), the electronic device may perform operation 311. According to an embodiment of the disclosure, when determining that the duration of the event associated with is less than the specified time (operation 307—NO), the electronic device may perform operation 309.

In operation 309, the electronic device may identify end of the event and may resume playing the first content. According to an embodiment of the disclosure, the electronic device may identify the end of the event associated with the second content. For example, the electronic device may identify the end of the event associated with the second content depending on ending the playback of the second content. For another example, the electronic device may identify the end of the event associated with the second content depending on ending sound recording or video recording for generation of the second content. According to an embodiment of the disclosure, the electronic device may resume playing the first content depending on identifying the end of the event associated with the second content. According to an embodiment of the disclosure, the electronic device may resume playing the first content which is paused. According to an embodiment of the disclosure, that the electronic device resumes playing the first content may mean that the electronic device plays the first content from a time point (or a frame) when the first content is paused.

In operation 311, the electronic device may stop playing the first content. According to an embodiment of the disclosure, the electronic device may stop playing the first content which is paused. According to an embodiment of the disclosure, after stopping playing the first content, the electronic device may play the first content from the beginning rather than the time point (or the frame) when the first content is paused.

According to an embodiment of the disclosure, when executing the operation associated with the second content (e.g., playback of the second content or generation of the second content) while playing the first content, the electronic device may determine whether to resume playing the first content based on the duration of the event to execute the operation associated with the second content (or an execution time of the operation associated with the second content), thus providing a content output scheme to suit a usage situation or an intention of the user.

Hereinafter, a description will be given of an operation in which an electronic device according to an embodiment determines whether to resume playing the first content based on the duration of the event associated with the second content with reference to FIGS. 4A and 4B.

Figure 4A:
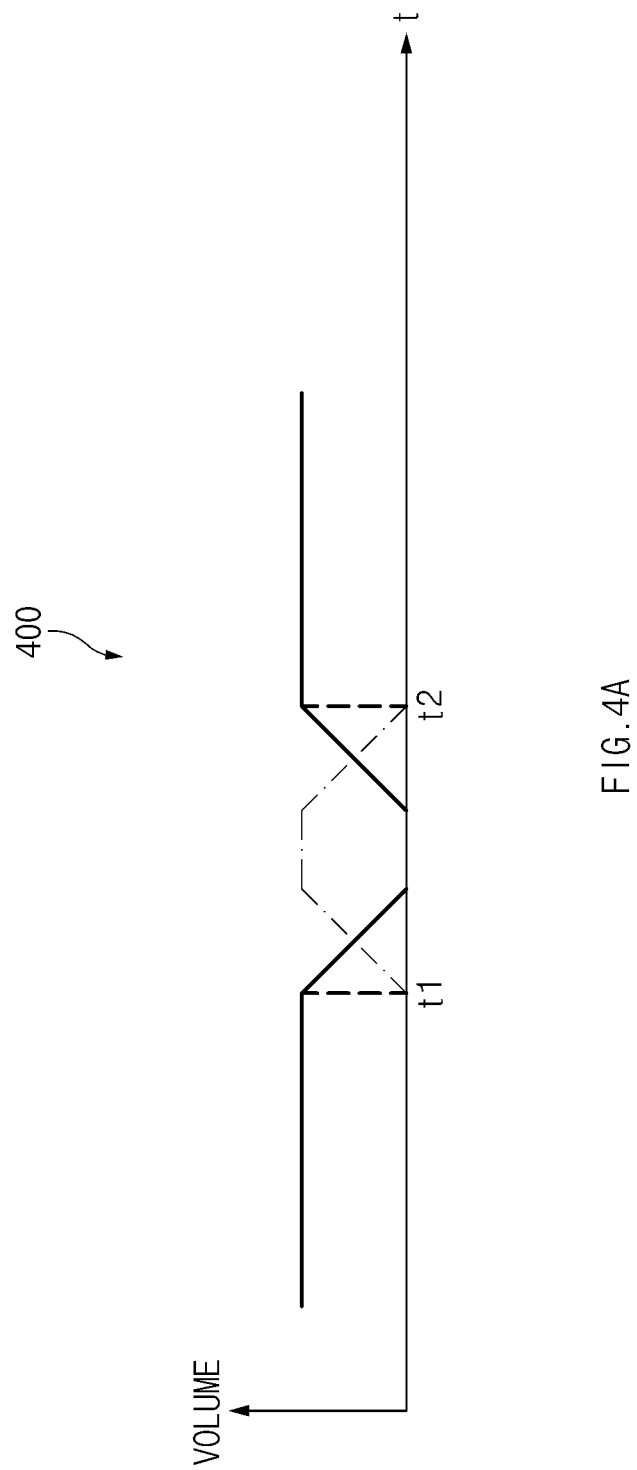
FIG. 4A illustrates an operation of an electronic device according to an embodiment of the disclosure.

FIGS. 4A and 4B are drawings 400 and 450 illustrating an operation of an electronic device according to various embodiments of the disclosure.

Operations of the electronic device, which will be described below, may be performed by an electronic device 101 of FIG. 1 or a processor 120 of the electronic device 101. In FIGS. 4A and 4B, the solid line may indicate the volume of the first content, and the dashed line may indicate the volume of the second content.

Referring to FIG. 4A, the electronic device may play first content. According to an embodiment of the disclosure, the electronic device may output a screen of content on a display (e.g., the display module 160 of FIG. 1) and may output a sound of the content through a speaker (e.g., the sound output module 155 of FIG. 1). According to an embodiment of the disclosure, the electronic device may play the first content using a first application. According to an embodiment of the disclosure, the electronic device may identify occurrence of an event associated with second content, depending on receiving a user input to play the second content using a second application at a first time point t1. According to an embodiment of the disclosure, the event associated with the second content may include playback of the second content. According to an embodiment of the disclosure, the electronic device may pause the playback of the first content and may play the second content, depending on receiving the user input to play the second content using the second application. Thus, it may be shown that the volume of the first content decreases and the volume of the second content increases at the first time point t1 on a graph of FIG. 4A.

According to an embodiment of the disclosure, the electronic device may end the playback of the second content at a second time point t2. According to an embodiment of the disclosure, the electronic device may identify end of an event associated with the second content, depending on ending the playback of the second content. For example, the electronic device may end the playback of the second content depending on playing a last frame of the second content. For another example, the electronic device may end the playback of the second content depending on changing the screen output on the display from a screen which outputs the second content to another screen based on a user input.

According to an embodiment of the disclosure, the electronic device may determine whether to resume playing the first content based on a duration of the event associated with the second content. According to an embodiment of the disclosure, the duration of the event associated with the second content may correspond to a time (t2−t1) from the time point t1 when the occurrence of the event associated with the second content is identified to the time point t2 when the end of the event associated with the second content is identified. For example, the duration of the event associated with the second content may be a playback time of the second content. According to an embodiment of the disclosure, as it is determined that the duration (t2−t1) of the event associated with the second content is less than a specified time t0 (t0>t2−t1), the electronic device may determine to resume playing the first content. According to an embodiment of the disclosure, the electronic device may resume playing the first content depending on identifying the end of the event associated with the second content based on determining to resume playing the first content. According to an embodiment of the disclosure, the electronic device may end the playback of the second content at the second time point t2 when the end of the event associated with the second content is identified and may resume playing the first content. Thus, it may be shown that the volume of the second content decreases and the volume of the first content increases at the second time point t2 on the graph of FIG. 4A.

Referring to FIG. 4B, the electronic device may play the first content. According to an embodiment of the disclosure, the electronic device may play the first content using the first application. According to an embodiment of the disclosure, the electronic device may identify occurrence of the event associated with the second content, depending on receiving a user input to play the second content using the second application at a third time point t3. According to an embodiment of the disclosure, the event associated with the second content may include playback of the second content. According to an embodiment of the disclosure, the electronic device may pause the playback of the first content and may play the second content, depending on receiving the user input to play the second content using the second application. Thus, it may be shown that the volume of the first content decreases and the volume of the second content increases at the third time point t3 on a graph of FIG. 4B.

According to an embodiment of the disclosure, the electronic device may end the playback of the second content at a fourth time point t4. According to an embodiment of the disclosure, the electronic device may identify end of the event associated with the second content, depending on ending the playback of the second content. For example, the electronic device may end the playback of the second content depending on playing a last frame of the second content. For another example, the electronic device may end the playback of the second content depending on changing the screen output on the display from the screen which outputs the second content to another screen based on a user input.

According to an embodiment of the disclosure, the electronic device may determine whether to resume playing the first content based on the duration of the event associated with the second content. According to an embodiment of the disclosure, the duration of the event associated with the second content may correspond to a time (t4–t3) from the time point t3 when the occurrence of the event associated with the second content is identified to the time point t4 when the end of the event associated with the second content is identified. For example, the duration of the event associated with the second content may be a playback time of the second content. According to an embodiment of the disclosure, when it is determined that the duration (t4–t3) of the event associated with the second content is greater than or equal to the specified time t0 (t0<=t4–t3), the electronic device may determine not to resume playing the first content. According to an embodiment of the disclosure, the electronic device may stop playing the first content depending on determining not to resume playing the first content. According to an embodiment of the disclosure, the electronic device may fail to resume playing the first content although ending the playback of the second content at the fourth time point t4 when the end of the event associated with the second content is identified. Thus, it may be shown that the volume of the second content decreases at the fourth time point t4 on the graph of FIG. 4B. The volume of the first content may be maintained in a state in which it is reduced at the third time point t3.

Hereinafter, an operation of the electronic device according to an embodiment will be described with reference to FIG. 5.

Figure 5:
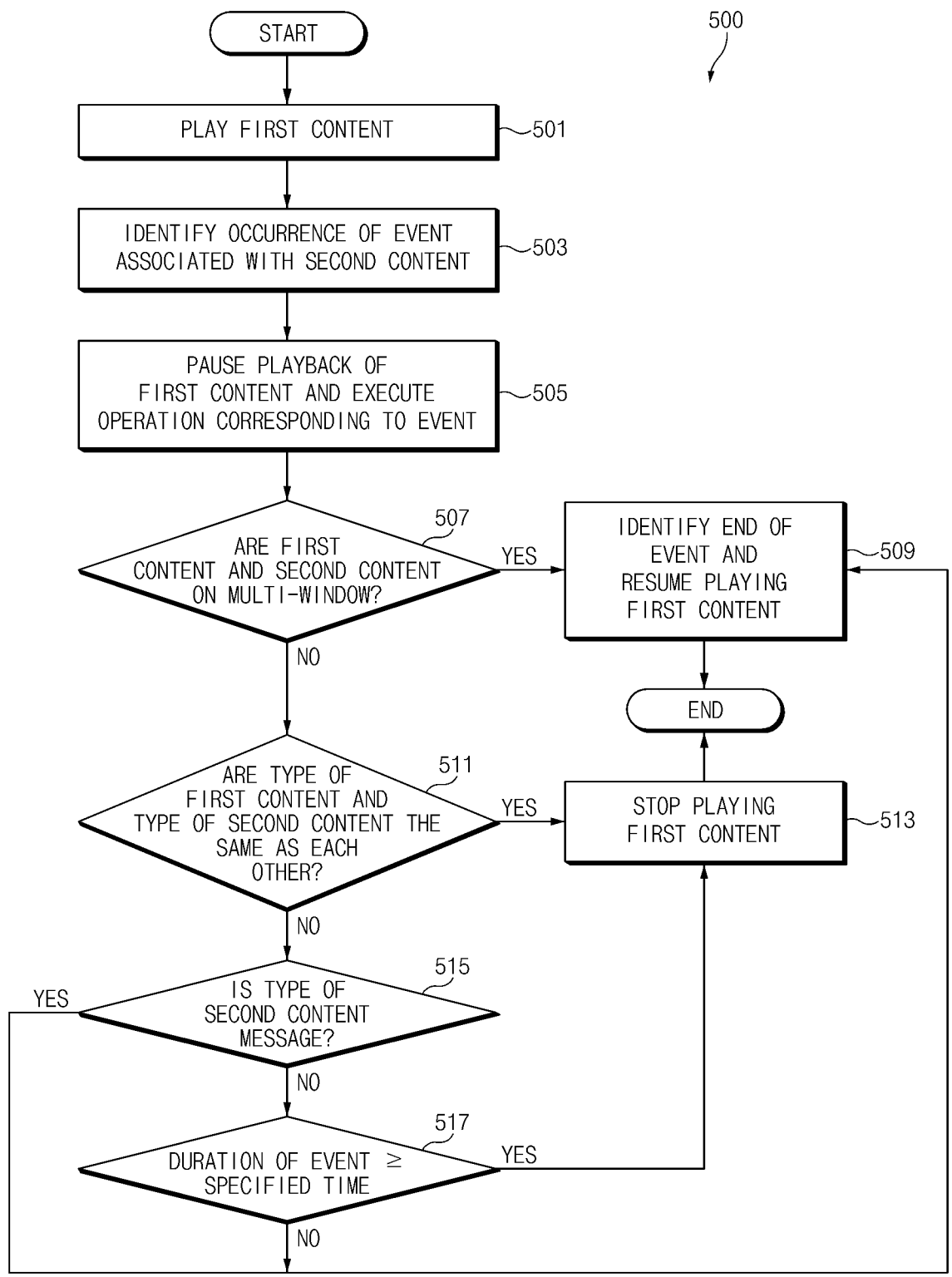
FIG. 5 is a flowchart illustrating an operation of an electronic device according to an embodiment of the disclosure.

FIG. 5 is a flowchart 500 illustrating an operation of an electronic device according to an embodiment of the disclosure.

Referring to FIG. 5, operations of the electronic device, which will be described below, may be performed by an electronic device 101 of FIG. 1 or a processor 120 of the electronic device 101.

In operation 501, the electronic device may play first content. According to an embodiment of the disclosure, operation 501 may correspond to operation 301 of FIG. 3. The description of operation 301 of FIG. 3 may be applied to operation 501 in the same manner. According to an embodiment of the disclosure, the electronic device may play the first content using a first application. According to an embodiment of the disclosure, the electronic device may play the first content by means of at least one of its display and its speaker.

In operation 503, the electronic device may identify occurrence of an event associated with second content. According to an embodiment of the disclosure, operation 503 may correspond to operation 303 of FIG. 3. The description of operation 303 of FIG. 3 may be applied to operation 503 in the same manner. According to an embodiment of the disclosure, the event associated with the second content may include playback of the second content or generation of the second content. According to an embodiment of the disclosure, the electronic device may identify the occurrence of the event associated with the second content by means of a second application.

In operation 505, the electronic device may pause the playback of the first content and may execute an operation corresponding to the event. According to an embodiment of the disclosure, operation 505 may correspond to operation 305 of FIG. 3. The description of operation 305 of FIG. 3 may be applied to operation 505 in the same manner. According to an embodiment of the disclosure, the electronic device may pause the playback of the first content and may execute the operation corresponding to the event, depending on identifying the occurrence of the event associated with the second content while playing the first content. According to an embodiment of the disclosure, the electronic device may pause the playback of the first content and may play the second content, depending on receiving a user input to play the second content using the second application while playing the first content using the first application. According to another embodiment of the disclosure, the electronic device may pause the playback of the first content and may generate the second content, depending on receiving a user input to generate the second content using the second application while playing the first content using the first application.

In operation 507, the electronic device may determine whether the first content and the second content are output on a multi-window. According to an embodiment of the disclosure, the electronic device may determine (or identify) whether an execution screen of the first application for playing the first content and an execution screen of the second application for executing an operation corresponding to the event associated with the second content are output as a multi-window. According to an embodiment of the disclosure, that the electronic device outputs the plurality of screens as the multi-window may mean that the electronic device divides a display area of the display into a plurality of areas and respectively displays the plurality of screens on the divided areas. According to an embodiment of the disclosure, the electronic device may display the execution screen of the first application and the execution screen of the second application as one screen corresponding to the display area of the display on the display. For example, when both the execution screen of the first application and the execution screen of the second application are displayed on the display, the electronic device may determine (or identify) that the execution screen of the first application and the execution screen of the second application are output as the multi-window.

According to an embodiment of the disclosure, the electronic device may perform operation 509 depending on determining that the execution screen of the first application and the execution screen of the second application are output as the multi-window (operation 507—YES) and may perform operation 511 depending on determining that the execution screen of the first application and the execution screen of the second application are not output as the multi-window (operation 507—NO).

In operation 509, the electronic device may identify end of the event and may resume playing the first content. According to an embodiment of the disclosure, operation 509 may correspond to operation 309 of FIG. 3. The description of operation 309 of FIG. 3 may be applied to operation 509 in the same manner. According to an embodiment of the disclosure, the electronic device may resume playing the first content depending on identifying the end of the event associated with the second content. According to an embodiment of the disclosure, the electronic device may resume playing the first content depending on identifying the end of the event associated with the second content based on that the execution screen of the first application and the execution screen of the second application are output as the multi-window. For example, the electronic device may resume playing the first content after the event associated with the second content is ended (or after the electronic device ends the execution of the operation corresponding to the event associated with the second content) based on that the execution screen of the first application and the execution screen of the second application are output as the multi-window.

In operation 511, the electronic device may determine whether a type of the first content and a type of the second content are the same as each other. According to an embodiment of the disclosure, the electronic device may identify a type of content. According to an embodiment of the disclosure, the electronic device may identify a type of content based on a type of an application for executing an operation associated with the content. According to an embodiment of the disclosure, the electronic device may identify a type of content based on a type of an application for playing or generating the content. For example, the type of the application for playing the content may include at least one of a video application, a music application, a radio application, a search engine application, a social network service (SNS) application, a real-time broadcasting application, a message application, a recording application, or a camera application. According to an embodiment of the disclosure, although the first application for playing the first content and the second application for executing the operation corresponding to the event associated with the second content are different applications, they may belong to the same application type. According to an embodiment of the disclosure, the electronic device may determine that the type of the first content and the type of the second content are the same as each other depending on the type of the first application and the type of the second application are the same as each other and may determine that the type of the first content and the type of the second content are not the same as each other depending on the type of the first application and the type of the second application are not the same as each other.

According to an embodiment of the disclosure, the electronic device may perform operation 513 depending on determining that the type of the first content and the type of the second content are the same as each other (operation 511—YES) and may perform operation 515 depending on determining that the type of the first content and the type of the second content are not the same as each other (operation 511—NO).

In operation 513, the electronic device may stop playing the first content. According to an embodiment of the disclosure, operation 513 may correspond to operation 311 of FIG. 3. The description of operation 311 of FIG. 3 may be applied to operation 513 in the same manner. According to an embodiment of the disclosure, the electronic device may stop playing the first content which is paused.

In operation 515, the electronic device may determine whether the type of the second content is a message. According to an embodiment of the disclosure, the second content may be a voice message or an image message received from an external electronic device (e.g., the external electronic device 104 or a server 108 of FIG. 1) through a communication circuit (e.g., a communication module 190 of FIG. 1) by the electronic device. According to an embodiment of the disclosure, the electronic device may determine that the type of the second content is the message depending on that the second content is content received from in the form of a message from the external electronic device. For example, the electronic device may determine that the type of the second content is the message depending on that the second application for playing the second content is an application for receiving a message from the external electronic device.

According to an embodiment of the disclosure, the electronic device may perform operation 509 depending on determining that the type of the second content is the message (operation 515—YES) and may perform operation 517 depending on determining that the type of the second content is not the message (operation 515—NO). According to an embodiment of the disclosure, the electronic device may resume playing the first content depending on identifying the end of the event associated with the second content based on determining that the type of the second content is the message.

In operation 517, the electronic device may determine whether a duration of the event associated with the second content is greater than or equal to a specified time. According to an embodiment of the disclosure, operation 517 may correspond to operation 307 of FIG. 3. The description of operation 307 of FIG. 3 may be applied to operation 517 in the same manner. According to an embodiment of the disclosure, the electronic device may perform operation 513 depending on determining that the duration of the event is greater than or equal to the specified time (operation 517—YES) and may perform operation 509 depending on determining that the duration of the event is less than the specified time (operation 517—NO).

According to an embodiment of the disclosure, the electronic device may identify end of the event associated with the second content, depending on determining that the first content and the second content are not output as the multi-window, that the types of the first content and the second content are not the same as each other, that the type of the second content is not the message, and that the duration of the event associated with the second content is less than the specified time, and may resume playing the first content depending on identifying the end of the event associated with the second content. According to an embodiment of the disclosure, the electronic device may stop playing the first content, depending on determining that the first content and the second content are not output as the multi-window, that the types of the first content and the second content are not the same as each other, that the type of the second content is not the message, and that the duration of the event associated with the second content is greater than or equal to the specified time.

According to an embodiment of the disclosure, when outputting the first content and the second content as the multi-window, because of providing a user with a pause screen of the first screen together with a playback screen of the second content although receiving a user input to play the second content while playing the first content, the electronic device may determine that the user has an intention to resume playing the first content after the playback of the second content is ended and may resume playing the first content although there is no separate user input after ending the second content.

According to an embodiment of the disclosure, when the type of the first content and the type of the second content are different content, the electronic device may determine that the user does not have an intention to resume playing the first content and may stop playing the first content although there is no separate user input.

According to an embodiment of the disclosure, the message may have a one-off and a length (a playback time) of content corresponding to the message may be relatively short. According to an embodiment of the disclosure, when the type of the second content is a message, the electronic device may determine that the user has an intention to resume playing the first content after the playback of the second content is ended and may resume playing the first content although there is no separate user input.

According to an embodiment of the disclosure, the electronic device may determine whether to resume playing the first content regardless of whether the duration of the event associated with the second content is greater than or equal to the specified time, when the first content and the second content are output as the multi-window, that the type of the first content and the type of the second content are the same as each other, or that the type of the second content is the message. According to an embodiment of the disclosure, when the electronic device does not correspond to all the above-mentioned three usage situations, the electronic device may determine whether to resume playing the first content depending on whether the duration of the event associated with the second content is greater than or equal to the specified time. According to an embodiment of the disclosure, when playing the second content while playing the first content, the electronic device may determine whether to resume playing the first content to suit a usage situation of the user or an intention of the user.

Hereinafter, a description will be given of an operation in which an electronic device according to an embodiment determines whether to resume playing the first content when outputting the first content and the second content as the multi-window with reference to FIGS. 6A and 6B.

Figure 6A:
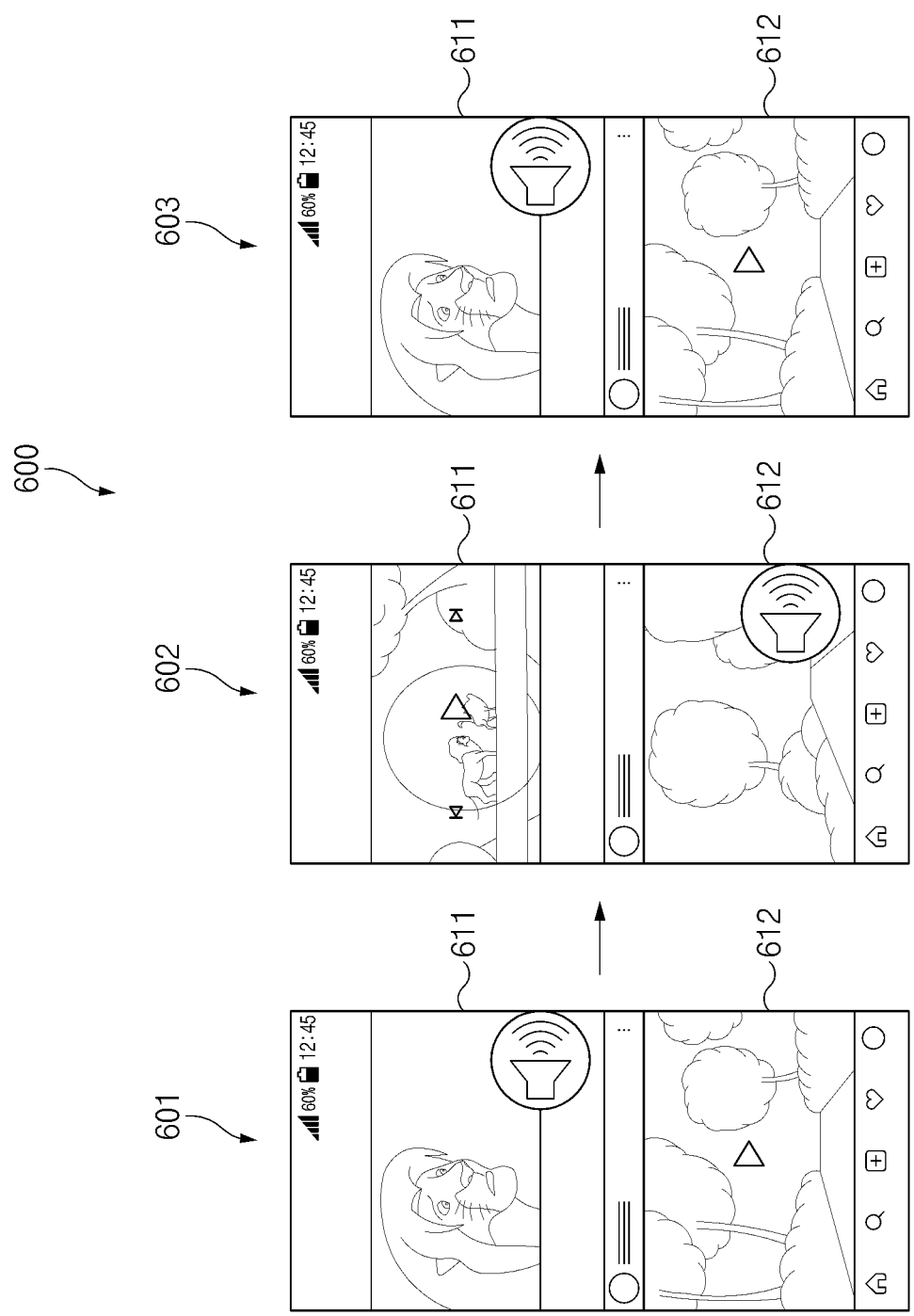
FIG. 6A illustrates an operation of an electronic device according to an embodiment of the disclosure.
Figure 6B:
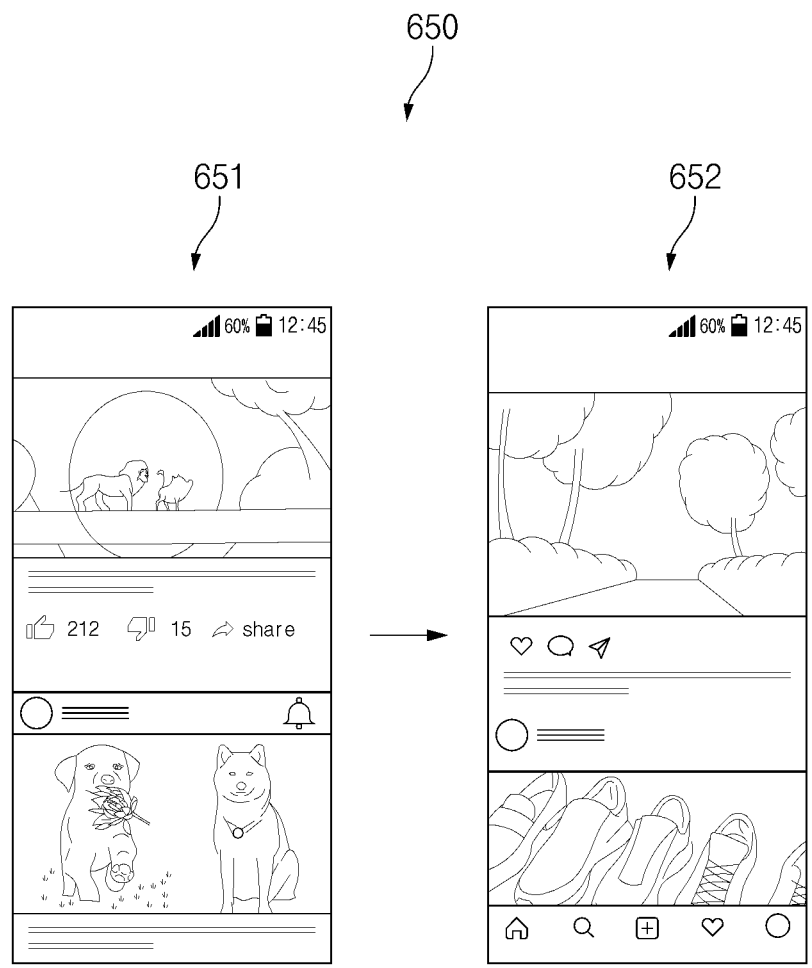
FIG. 6B illustrates an operation of an electronic device according to an embodiment of the disclosure.

FIGS. 6A and 6B are drawings 600 and 650 illustrating an operation of an electronic device according to various embodiments of the disclosure.

Referring to FIGS. 6A and 6B, operations of the electronic device, which will be described below, may be performed by an electronic device 101 of FIG. 1 or a processor 120 of the electronic device 101.

A first screen 601, a second screen 602, and a third screen 603 in FIG. 6A may be screens displayed in sequence on a display (e.g., the display module 160 of FIG. 1) by the electronic device. Referring to the first screen 601, the second screen 602, and the third screen 603, the electronic device may display an execution screen of a first application on a first window 611 and may display an execution screen of a second application on a second window 612.

Referring to the first screen 601, the electronic device may play first content using the first application. According to an embodiment of the disclosure, the electronic device may output a playback screen of first content on the first window 611. According to an embodiment of the disclosure, the electronic device may output a sound of the first content through a speaker (e.g., the sound output module 155 of FIG. 1). According to an embodiment of the disclosure, the electronic device may receive a user input to play second content using the second application while playing the first content. According to an embodiment of the disclosure, the electronic device may display the second screen 602 on the display depending on receiving a user input to play the second content using the second application while playing the first content.

Referring to the second screen 602, the electronic device may pause the first content which is played using the first application and may play the second content using the second application, depending on receiving the user input to play the second content using the second application while playing the first content. According to an embodiment of the disclosure, the electronic device may output a pause screen of the first content on the first window 611 and may output a playback screen of the second content on the second window 612. According to an embodiment of the disclosure, the electronic device may output a sound of the second content through the speaker. According to an embodiment of the disclosure, the electronic device may identify that the playback of the second content is ended. According to an embodiment of the disclosure, the electronic device may display the third screen 603 on the display depending on identifying that the playback of the second content is ended.

Referring to the third screen 603, the electronic device may resume playing the first content depending on identifying the playback of the second content is ended. According to an embodiment of the disclosure, the electronic device may output a screen on which the playback of the second content is ended on the second window 612 and may display a screen on which the playback of the first content is resumed on the first window 611. According to an embodiment of the disclosure, the screen on which the playback of the second content is ended may include a screen on which the second content stops on a screen on which it is last played or a screen on which the second content stops on a first screen of the second content to be played again. According to an embodiment of the disclosure, the screen on which the playback of the first content is resumed may include a screen after a time point (or a frame) when the playback of the first content is paused. According to an embodiment of the disclosure, the electronic device may output a sound of the first content through the speaker. According to an embodiment of the disclosure, the electronic device may output a sound after a time point (or a frame) when the first content is paused through the speaker.

A first screen 651 and a second screen 652 in FIG. 6B may be screens displayed in sequence on the display by the electronic device.

Referring to the first screen 651, the electronic device may play the first content using the first application. According to an embodiment of the disclosure, the electronic device may output a playback screen of the first content as a full screen on the display. According to an embodiment of the disclosure, the electronic device may output a sound of the first content through the speaker (e.g., the sound output module 155 of FIG. 1). According to an embodiment of the disclosure, the electronic device may receive a user input to play the second content using the second application while playing the first content. According to an embodiment of the disclosure, the electronic device may display the second screen 652 on the display depending on receiving a user input to play the second content using the second application while playing the first content.

Referring to the second screen 652, the electronic device may pause the first content which is played using the first application and may play the second content using the second application, depending on receiving the user input to play the second content using the second application while playing the first content. According to an embodiment of the disclosure, the electronic device may end displaying the playback screen of the first content (or an execution screen of the first application for playing the first content) and may display a playback screen of the second content (or an execution screen of the second application for playing the second content) on the display. According to an embodiment of the disclosure, the electronic device may output a sound of the second content through the speaker.

According to an embodiment of the disclosure, the electronic device may identify that the playback of the second content is ended. According to an embodiment of the disclosure, although identifying that the playback of the second content is ended, the electronic device may keep the execution screen of the second application displayed on the display and may fail to change the execution screen of the first application to be displayed.

Hereinafter, a description will be given of a user interface for setting whether the electronic device according to an embodiment of the disclosure will perform operations of the electronic device, which are shown in FIG. 3 or 5, with reference to FIG. 7.

Figure 7:
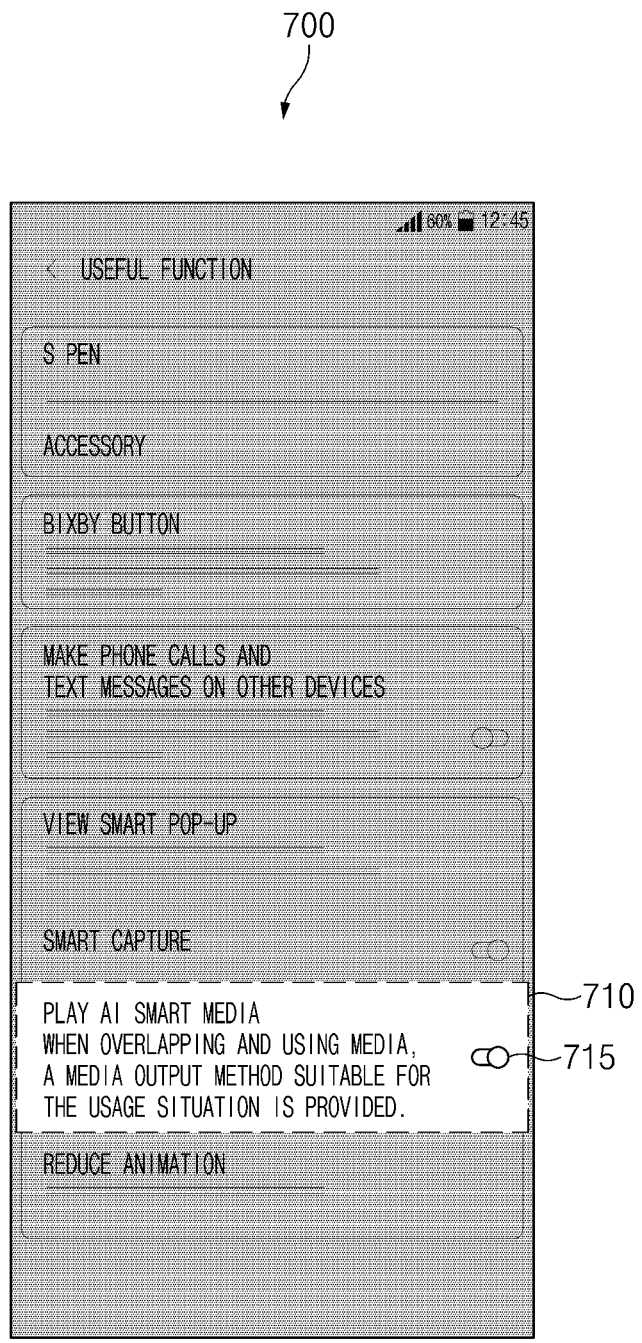
FIG. 7 illustrates a user interface provided by an electronic device according to an embodiment of the disclosure.

FIG. 7 is a drawing 700 illustrating a user interface provided by an electronic device according to an embodiment of the disclosure.

Referring to FIG. 7, operations of the electronic device, which will be described below, may be performed by an electronic device 101 of FIG. 1 or a processor 120 of the electronic device 101.

According to an embodiment of the disclosure, the electronic device may display a user interface 710 for setting whether to perform operations shown in FIG. 3 or 5 on a display (e.g., the display module 160 of FIG. 1). According to an embodiment of the disclosure, the user interface 710 may include a button 715. According to an embodiment of the disclosure, the electronic device may receive an on/off selection input to the button 715 from a user. According to an embodiment of the disclosure, the electronic device may be configured to perform the operations of the electronic device, which are shown in FIG. 3 or 5, depending on receiving the input for selecting on for the button 715 and may be configured not to perform the operations of the electronic device, which are shown in FIG. 3 or 5, depending on receiving the input for selecting off for the button 715.

For example, as the electronic device is configured to perform the operations of the electronic device, which are shown in FIG. 3, it may pause playback of first content depending on identifying occurrence of an event associated with second content while playing the first content, may execute an operation corresponding to the event associated with the second content, and may resume playing the first content depending on identifying the end of the event associated with the second content based on determining that a duration of the event associated with the second content is less than a specified time. For example, as the electronic device is configured not to perform the operations of the electronic device, which are shown in FIG. 3, it may stop playing the first content depending on identifying the occurrence of the event associated with the second content while playing the first content and may execute the operation corresponding to the event associated with the second content. In this case, the electronic device may fail to resume playing the first content regardless of the duration of the event associated with the second content.

According to various embodiments of the disclosure, the electronic device may be set to a default to perform the operations of the electronic device, which are shown in FIG. 3 or 5, when manufactured.

Hereinafter, a description will be given of an operation in which the electronic device according to an embodiment plays content depending on whether a specified condition associated with a behavior pattern of a user is met with reference to FIG. 8.

Figure 8:
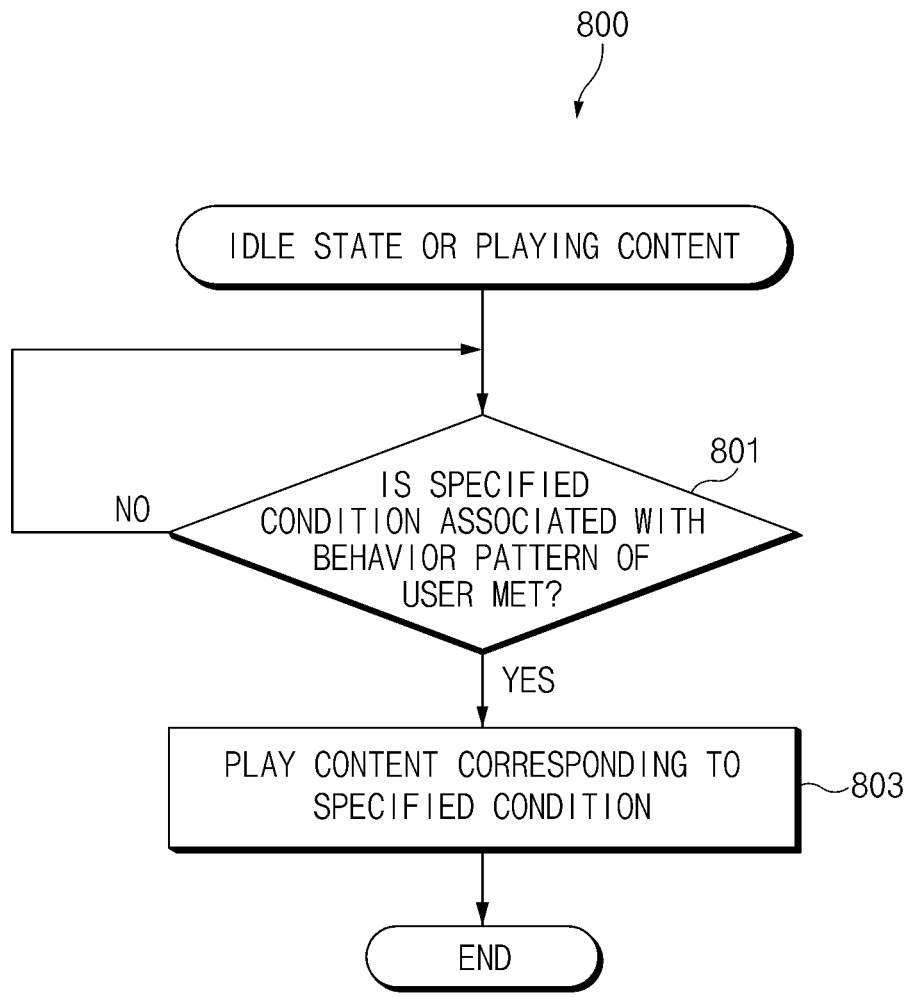
FIG. 8 is a flowchart illustrating an operation of an electronic device according to an embodiment of the disclosure.

FIG. 8 is a flowchart 800 illustrating an operation of an electronic device according to an embodiment of the disclosure.

Operations of the electronic device, which will be described below, may be performed by an electronic device 101 of FIG. 1 or a processor 120 of the electronic device 101.

Referring to FIG. 8, according to an embodiment of the disclosure, the electronic device may be an idle state in which it does not play content or a state in which it is playing the content. According to an embodiment of the disclosure, the electronic device may perform operation 801 and operation 803 in the idle state or the state in which it is playing the content.

In operation 801, the electronic device may determine whether a specified condition associated with a behavior pattern of a user is met. According to an embodiment of the disclosure, the user may repeat a behavior for controlling the electronic device to play content in a specific situation (a connection between the electronic device and a specific audio device, a specific time, or a specific place). The repeated behavior may be referred to as a behavior pattern of the user in the disclosure. For example, the user may have a behavior pattern for connecting the electronic device with an audio system of a car and playing music through a speaker of the car using a music application stored in the electronic device. For another example, the user may have a behavior pattern for connecting the electronic device with an external speaker after returning home and playing music through the external speaker using the music application stored in the electronic device.

According to an embodiment of the disclosure, the electronic device may store a specific situation corresponding to the behavior pattern of the user as a specified condition associated with the behavior pattern of the user in a memory (e.g., the memory 130 of FIG. 1). For example, the specified condition associated with the behavior pattern of the user, which is stored (or registered) in the electronic device, may include at least one of whether the electronic device is connected with a car audio system, whether the electronic device is located at a specified place, or whether the electronic device is connected with an external speaker in a specified time.

According to an embodiment of the disclosure, the electronic device may determine whether the specified condition associated with the behavior pattern of the user is met. The electronic device may recognize that the electronic device or the user of the electronic device is in the specific situation corresponding to the behavior pattern of the user depending on determining whether the specified condition associated with the behavior pattern of the user is met. According to an embodiment of the disclosure, the electronic device may recognize that the electronic device is connected with an external audio device using a communication circuit (e.g., a communication module 190 of FIG. 1). According to an embodiment of the disclosure, the electronic screen may recognize that the electronic device or the user of the electronic device is located at the specific place using at least one sensor (e.g., a GPS sensor). For example, the electronic device may determine that the specified condition associated with the behavior pattern of the user is met depending on recognizing that the electronic device is connected with the car audio system. For another example, the electronic device may determine that the specified condition associated with the behavior pattern of the user is met depending on recognizing that the electronic device is located at a location registered as the home of the user, that the time set in the electronic device is after 6 p.m., and that the electronic device is connected with a speaker in the home of the user.

According to an embodiment of the disclosure, the electronic device may perform operation 803 depending on determining that the specified condition associated with the behavior pattern of the user is met (operation 801—YES). According to an embodiment of the disclosure, the electronic device may maintain a previous state (e.g., the idle state or the state in which it is playing the content) depending on determining that the specified condition associated with the behavior pattern of the user is not met (operation 801—NO).

In operation 803, the electronic device may play content corresponding to the specified condition. According to an embodiment of the disclosure, the content corresponding to the specified condition may refer to content capable of being played using a specific application by the electronic device depending to the behavior pattern of the user, which is associated with the specified condition. For example, when the behavior pattern of the user who plays music through the speaker of the car using the first application as the electronic device is connected with the car audio system is stored (or registered) in the electronic device, the electronic device may determine that the condition associated with the behavior pattern of the user is met depending on recognizing that it is connected with the car audio system and may play music through the speaker of the car using the first application. For another example, when the electronic device is located at the location registered as the home of the user after the user of the electronic device returns home (after 6 p.m.) and when the behavior pattern of the user who plays music through the speaker at home using the second application as the electronic device is connected with the speaker at home is stored (or registered) in the electronic device, the electronic device may determine that the condition associated with the behavior pattern of the user is met depending on recognizing that the electronic device is located at the location registered as the home of the user after 6 p.m. and is connected with the speaker at home and may play music through the speaker at home using the second application.

According to an embodiment of the disclosure, the electronic device may play content corresponding to the specified condition depending on that the specified condition associated with the behavior pattern of the user, which is stored (or registered) in the electronic device, is met, thus reducing inconvenience in which the user should repeatedly control the electronic device to play content in a specific situation to improve a user experience.

Hereinafter, a description will be given of an operation in which the electronic device according to an embodiment controls playback of content based on a behavior pattern of the user, which is stored (or registered) in the electronic device, with reference to FIGS. 9 and 10.

Figure 9:
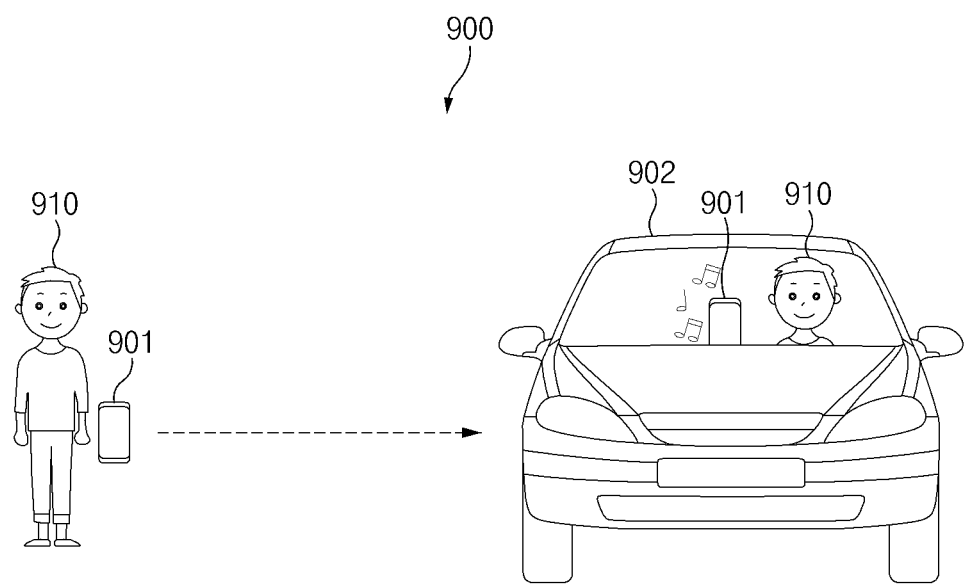
FIG. 9 illustrates an operation of an electronic device according to an embodiment of the disclosure.

FIG. 9 is a drawing 900 illustrating an operation of an electronic device according to an embodiment of the disclosure.

Referring to FIG. 9, operations of an electronic device 901 (e.g., an electronic device 101 of FIG. 1), which will be described below, may be performed by a processor (e.g., a processor 120 of FIG. 1) of the electronic device 901.

A user 910 of the electronic device 901 may ride in a car 902 while carrying the electronic device 901. According to an embodiment of the disclosure, the user 910 may have a behavior pattern for connecting the electronic device 901 with an audio system of the car 902 and playing music through a speaker of the car 902 using a first application stored in the electronic device 901. According to an embodiment of the disclosure, the electronic device 901 may store the behavior pattern for playing music through the speaker of the car 902 using the first application under the condition of being connected with the audio system of the car 902 in a memory (e.g., the memory 130 of FIG. 1) of the electronic device 901. According to an embodiment of the disclosure, the electronic device 901 may play music through the speaker of the car 902 using the first application stored in the electronic device 901 depending on recognizing that it is connected with the audio system of the car 902. For example, although the electronic device 901 does not receive a user input to play music using the first application after being connected with the audio system of the car 902 in an idle state, it may play music through the speaker of the car 902 using the first application depending on recognizing that it is connected with the audio system of the car 902. For another example, although the electronic device 901 is connected with the audio system of the car 902 in a state in which it is executing an application different from the first application, it may play music through the speaker of the car 902 using the first application without a separate user input.

Figure 10:
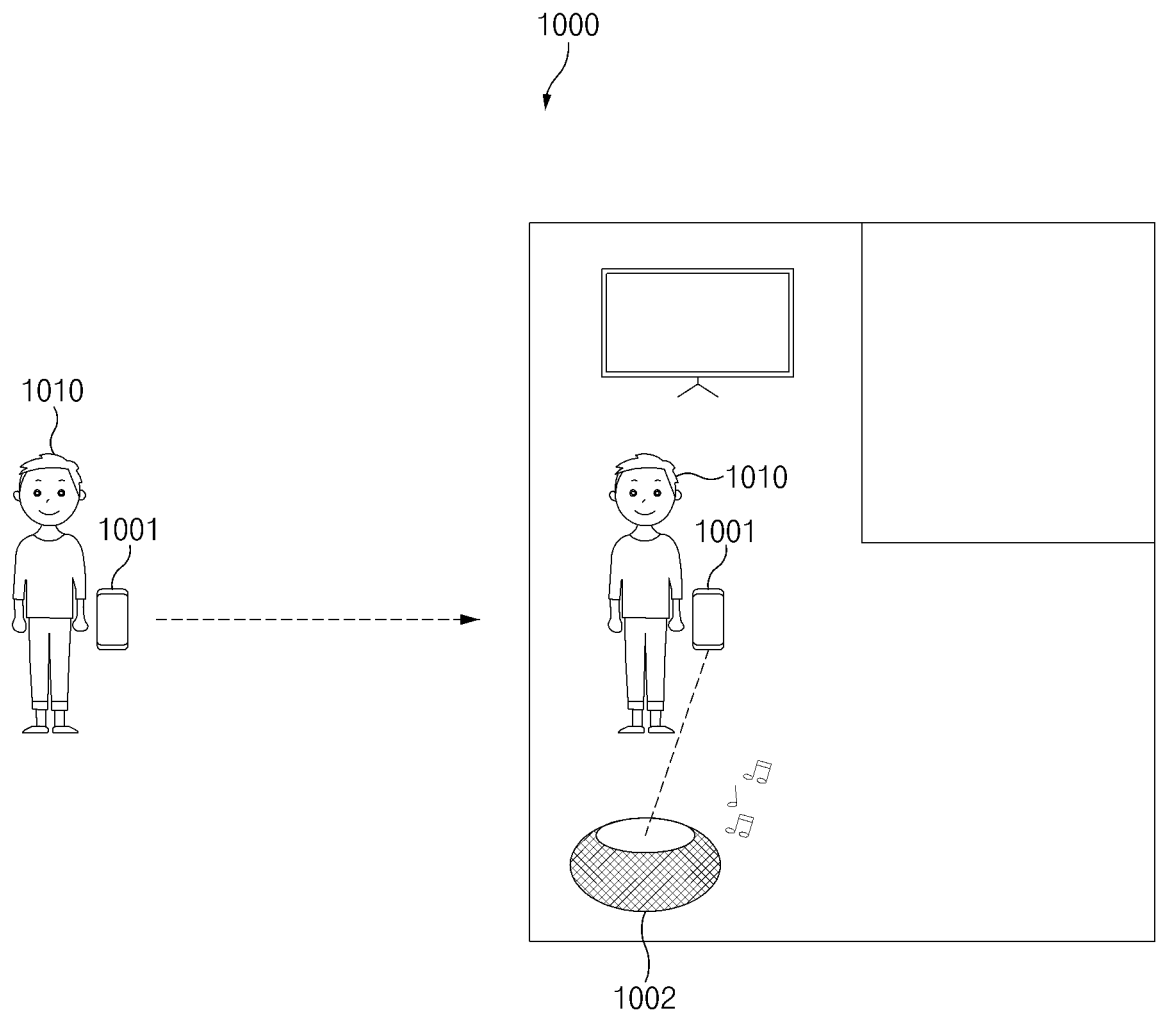
FIG. 10 illustrates an operation of an electronic device according to an embodiment of the disclosure.

FIG. 10 is a drawing 1000 illustrating an operation of an electronic device according to an embodiment of the disclosure.

Referring to FIG. 10, operations of an electronic device 1001 (e.g., an electronic device 101 of FIG. 1), which will be described below, may be performed by a processor (e.g., a processor 120 of FIG. 1) of the electronic device 1001.

A user 1010 of the electronic device 1001 may return home while carrying the electronic device 1001. According to an embodiment of the disclosure, the user 1010 may have a behavior pattern for connecting the electronic device 1001 with a speaker 1002 at home after returning home and playing music through a speaker 1002 using a first application stored in the electronic device 1001. For example, when the electronic device 1001 is located at a location registered as the home of the user 1010 after 6 p.m., it may recognize that the user 1010 returns home. According to an embodiment of the disclosure, the electronic device 1001 may store a behavior pattern for playing music through the speaker 1002 using the first application under the condition that it is located at the location registered as the home of the user 1010 after 6 p.m. and is connected with the speaker 1002 at home in a memory (e.g., the memory 130 of FIG. 1) of the electronic device 1001. According to an embodiment of the disclosure, the electronic device 1001 may play music through the speaker 1002 using the first application stored in the electronic device 1001 depending on recognizing that it is located at the location registered as the home of the user 1010 after 6 p.m. and is connected with the speaker 1002 at home. According to an embodiment of the disclosure, although the electronic device 1001 does not receive a user input to play music using the first application after it is located at the location registered as the home of the user 1010 after 6 p.m. and is connected with the speaker 1002 at home, it may play the music through the speaker 1002 using the first application.

Figure 11:
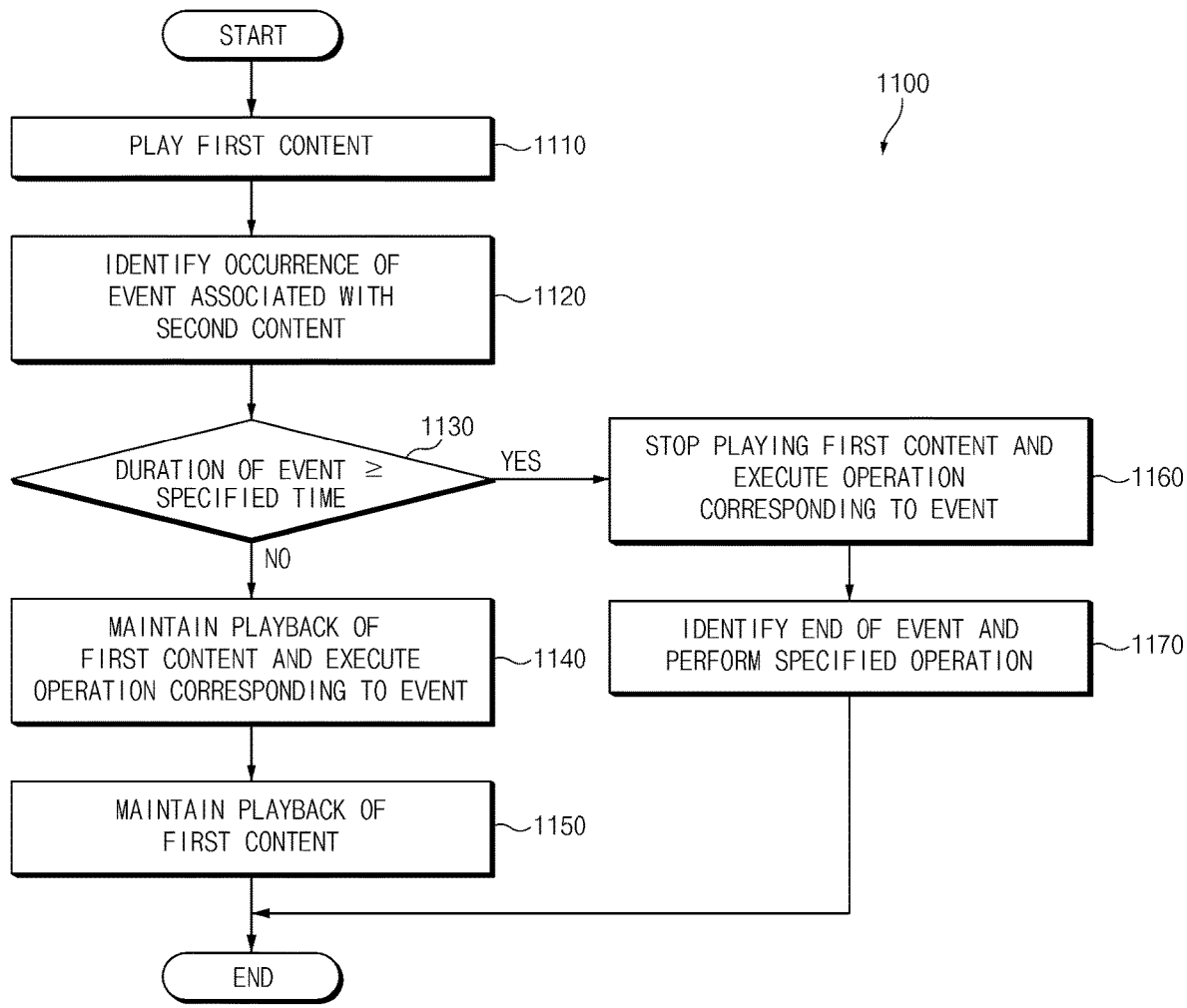
FIG. 11 is a flowchart of an electronic device according to an embodiment of the disclosure.

FIG. 11 is a flowchart 1100 of an electronic device according to an embodiment of the disclosure.

Operations of the electronic device, which will be described below, may be performed by an electronic device 101 of FIG. 1 or a processor 120 of the electronic device 101.

Referring to FIG. 11, in operation 1110, the electronic device may play first content by means of a first application. According to an embodiment of the disclosure, as described above with reference to FIG. 3, the first content may be media content. For example, the first content may include music, a voice, or a video. For example, the electronic device may play the first content by means of at least one of its display and its speaker.

In operation 1120, the electronic device may identify occurrence of an event associated with second content. According to an embodiment of the disclosure, the electronic device may identify the occurrence of the event associated with the second content while playing the first content. According to an embodiment of the disclosure, as described above with reference to FIG. 3, the second content may be media content played by means of the first application or a second application different from the first application. According to an embodiment of the disclosure, the event associated with the second content may include playback of the second content or generation of the second content.

In operation 1130, the electronic device may determine whether a duration of the event is greater than or equal to a specified time. According to an embodiment of the disclosure, the duration of the event may include a playback time of the second content or a generation time of the second content. According to an embodiment of the disclosure, as described above with reference to FIG. 3, the playback time of the second content may refer to a time taken from a time point when the electronic device starts to play the second content to a time point when the electronic device ends the playback of the second content. For example, the playback time of the second content may be associated with a playback speed of the second content. For example, when the second content which is a 10-second video is played at 1× speed, the playback time of the second content is 10 seconds. Furthermore, when the second content which is the 10-second video is played at 2× speed, the playback time of the second content is 5 seconds. However, this is merely illustrative, and various embodiments are not limited thereto.

According to an embodiment of the disclosure, the electronic device may determine whether to play the first content when playing the second content based on the duration of the event associated with the second content. For example, the electronic device may determine whether to play the second content alone or play the second content together with the first content. For example, the electronic device may perform operation 1140 and operation 1150, when it is determined that the duration of the event associated with the second content is less than the specified time (operation 1130—NO), and may perform operation 1160 and operation 1170, when it is determined that the duration of the event associated with the second content is greater than or equal to the specified time (operation 1130—YES).

In operation 1140, the electronic device may execute an operation corresponding to the event while maintaining the playback of the first content. For example, as described above with reference to FIG. 3, the operation corresponding to the event may include an operation of playing the second content or an operation of generating the second content. According to an embodiment of the disclosure, the electronic device may play the second content or may generate the second content, while playing the first content. According an embodiment of the disclosure, the electronic device may control the first content and the second content to be played at substantially the same volume or different volume. A description will be given in detail below of it with reference to FIG. 12A.

In operation 1150, the electronic device may identify end of the event and may continue playing the first content. According to an embodiment of the disclosure, as described above with reference to FIG. 3, the electronic device may identify the end of the event associated with the second content depending on ending the playback of the second content or the generation of the second content and may maintain the playback of the first content. For example, the electronic device may perform only the operation of playing the first content as before the occurrence of the event associated with the second content is identified.

As described above, playback volume of the first content may be controlled while the operation corresponding to the event is executed. In this regard, in operation 1150, the electronic device may perform an operation of restoring the playback volume of the first content to previous volume.

In operation 1160, the electronic device may stop playing the first content and may execute the operation corresponding to the event. According to an embodiment of the disclosure, the electronic device may play the second content or may generate the second content, in the state in which the playback of the first content is stopped.

In operation 1170, the electronic device may identify end of the event and may perform a specified operation. According to an embodiment of the disclosure, the specified value may be an operation of outputting an execution screen of a third application different from the first application and the second application. For example, the execution screen of the third application may include a home screen. However, this is merely illustrative, and various embodiments are not limited thereto. For example, the electronic device may resume playing the first content rather than performing the specified operation. A description will be given in detail below of it with reference to FIG. 12B.

Figure 12A:
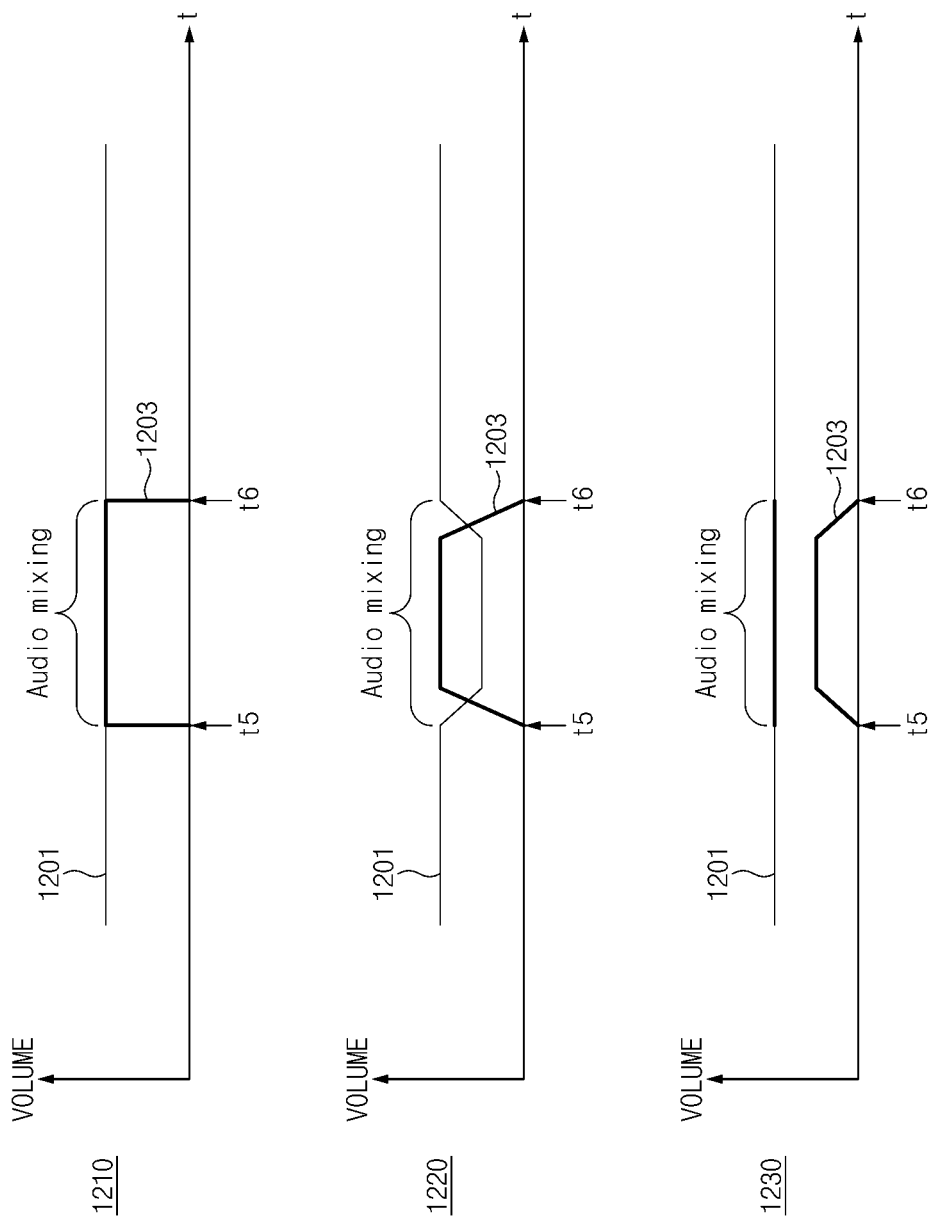
FIG. 12A illustrates an operation of playing second content together with first content in an electronic device according to an embodiment of the disclosure.

FIG. 12A illustrates an operation of playing second content together with first content in an electronic device according to an embodiment of the disclosure.

Referring to FIG. 12A, as described above with reference to FIG. 11, when it is determined that a duration of an event associated with the second content is less than a specified time, the electronic device according to various embodiments may play the second content together with the first content.

In this regard, as shown in 1210 of FIG. 12A, the electronic device may process volume of first content 1201 and volume of second content 1203 in substantially the same manner. For example, the electronic device may play the second content 1203 at first volume to correspond to the first content 1201 played at the first volume, from a time point (e.g., a fifth time point t5) when occurrence of an event is identified to a time point (e.g., a sixth time point t6) when end of the event is detected. Thus, a user may obtain the effect of viewing the first content 1201 and the second content 1203 together.

However, when the first content 1201 and the second content 1203 are output together, viewing for the first content 1201 (or the second content 1203) may be disrupted by the second content 1203 (or the first content 1201). In this regard, as shown in 1220 and 1230 of FIG. 12A, the electronic device may control the first content 1201 and the second content 1203 to be played at different volume, thus preventing viewing for any one content from being disrupted.

According to an embodiment of the disclosure, as shown in 1220 of FIG. 12A, the electronic device may decrease volume of the first content 1201 to a certain level with respect to the first volume and may set volume of the second content 1203 to the first volume, from the time point (e.g., the fifth time point t5) when the occurrence of the event is identified to the time point (e.g., the sixth time point t6) when the end of the event is detected.

According to another embodiment of the disclosure, as shown in 1230 of FIG. 12A, the electronic device may maintain the volume of the first content 1201 as the first volume and may decrease the volume of the second content 1203 to a certain level or more with respect to the first volume, from the time point (e.g., the fifth time point t5) when the occurrence of the event is identified to the time point (e.g., the sixth time point t6) when the end of the event is detected.

FIG. 12B illustrates an operation of playing second content alone in an electronic device according to an embodiment of the disclosure.

Referring to FIG. 12B, as described above with reference to FIG. 11, when it is determined that a duration of an event associated with second content 1203 is greater than or less than a specified time, the electronic device according to various embodiments may stop playing first content 1201 and may play the second content 1203 alone. Furthermore, after completing the playback of the second content 1203, the electronic device may perform a predetermined operation.

According to an embodiment of the disclosure, as shown in 1240 of FIG. 12B, the electronic device may perform a specified operation after a time point (e.g., a seventh time point t7) when the playback of the second content 1203 is completed. For example, when the playback of the second content 1203 is completed, the electronic device may output a home screen rather than playing the first content 1201. This corresponds to determination that a user is no longer interested in the first content 1201. The above-mentioned specified operation is not limited to the operation of outputting the home screen. For example, the electronic device may perform another operation except for the playback of the first content 1201, rather than the operation of outputting the home screen.

According to another embodiment of the disclosure, as shown in 1250 of FIG. 12B, the electronic device may resume playing the first content 1201 rather than outputting the home screen after the time point (e.g., the seventh time point t7) when the playback of the second content 1203 is completed.

According to an embodiment of the disclosure, an electronic device (e.g., the electronic device 101 of FIG. 1, an electronic device 901 of FIG. 9, or the electronic device 1001 of FIG. 10) may include a display (e.g., the display module 160 of FIG. 1), a speaker (e.g., the sound output module 155 of FIG. 1), a memory (e.g., the memory 130 of FIG. 1), and a processor (e.g., the processor 120 of FIG. 1) operatively connected with the display, the speaker, and the memory. The memory may store one or more instructions, when executed, causing the processor to pause playback of first content depending on identifying occurrence of an event associated with second content while playing the first content, execute an operation corresponding to the event, determine whether to resume playing the first content based on a duration of the event, and resume playing the first content depending on identifying end of the event based on determining to resume playing the first content.

According to an embodiment of the disclosure, the instructions may cause the processor to stop playing the first content based on determining not to resume playing the first content.

According to an embodiment of the disclosure, the instructions may cause the processor to determine whether the duration of the event is greater than or equal to a specified time, and determine to resume playing the first content, based on that the duration of the event is less than the specified time and determine not to resume playing the first content, based on that the duration of the event is greater than or equal to the specified time.

According to an embodiment of the disclosure, the specified time may be set to a specific time or may be set based on a content-related application usage pattern of a user of the electronic device.

According to an embodiment of the disclosure, the instructions may cause the processor to measure a time from a time point when deviating from a first application for playing the first content and executing the operation corresponding to the event using a second application to a time point when returning to the first application and resuming playing the first content to obtain time data and set the specified time based on the obtained time data.

According to an embodiment of the disclosure, the instructions may cause the processor to identify a first application for playing the first content and a second application for executing the operation corresponding to the event while playing the first content and set the specified time based on a combination of the identified first application and the identified second application.

According to an embodiment of the disclosure, the instructions may cause the processor to identify whether an execution screen of a first application for playing the first content and an execution screen of a second application for executing the operation corresponding to the event are output as a multi-window and resume playing the first content depending on identifying the end of the event based on that the execution screen of the first application and the execution screen of the second application are output as the multi-window.

According to an embodiment of the disclosure, the instructions may cause the processor to identify a type of the first content and a type of the second content and stop playing the first content based on that the type of the first content and the type of the second content are the same as each other.

According to an embodiment of the disclosure, the instructions may cause the processor to resume playing the first content depending on identifying the end of the event based on that the type of the second content is a message.

According to an embodiment of the disclosure, the instructions may cause the processor to identify whether a specified condition associated with a behavior pattern of a user of the electronic device is met and play content corresponding to the specified condition based on that the specified condition is met.

According to an embodiment of the disclosure, an operating method of an electronic device (e.g., an electronic device 101 of FIG. 1, an electronic device 901 of FIG. 9, or an electronic device 1001 of FIG. 10) may include pausing playback of first content depending on identifying occurrence of an event associated with second content while playing the first content, executing an operation corresponding to the event, determining whether to resume playing of the first content based on a duration of the event, and resuming playing the first content depending on identifying end of the event based on determining to resume playing the first content.

According to an embodiment of the disclosure, the operating method may further include stopping playing the first content based on determining not to resume playing the first content.

According to an embodiment of the disclosure, the operating method may further include determining whether the duration of the event is greater than or equal to a specified time, and determining to resume playing the first content, based on that the duration of the event is less than the specified time and determining not to resume playing the first content, based on that the duration of the event is greater than or equal to the specified time.

According to an embodiment of the disclosure, the specified time may be set to a specific time or may be set based on a content-related application usage pattern of a user of the electronic device.

According to an embodiment of the disclosure, the operating method may further include measuring a time from a time point when deviating from a first application for playing the first content and executing the operation corresponding to the event using a second application to a time point when returning to the first application and resuming playing the first content to obtain time data and setting the specified time based on the obtained time data.

According to an embodiment of the disclosure, the operating method may further include identifying a first application for playing the first content and a second application for executing the operation corresponding to the event while playing the first content and setting the specified time based on a combination of the identified first application and the identified second application.

According to an embodiment of the disclosure, the operating method may further include identifying whether an execution screen of a first application for playing the first content and an execution screen of a second application for executing the operation corresponding to the event are output as a multi-window and resuming playing the first content depending on identifying the end of the first event based on that the execution screen of the first application and the execution screen of the second application are output as the multi-window.

According to an embodiment of the disclosure, the operating method may further include identifying a type of the first content and a type of the second content and stopping playing the first content based on that the type of the first content and the type of the second content are the same as each other.

According to an embodiment of the disclosure, the operating method may further include resuming playing the first content depending on identifying the end of the event based on that the type of the second content is a message.

According to an embodiment of the disclosure, the operating method may further include identifying whether a specified condition associated with a behavior pattern of a user of the electronic device is met and playing content corresponding to the specified condition based on that the specified condition is met.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a microphone;
a speaker;
memory, comprising one or more storage media, storing instructions; and
one or more processors communicatively coupled to the display, the speaker, and the memory,
wherein the instructions, when executed by the one or more processors individually or collectively, cause the electronic device to:
in response to identifying an occurrence of an event associated with second content while playing first content using at least one of the display or the speaker, pause the playing of the first content and execute an operation corresponding to the event while the playback of the first content is paused, the operation corresponding to the event being executed by using at least one of the display, the speaker, or the microphone,
based on a result of comparing a duration of the operation corresponding to the event and a specified amount of time, determine whether to resume the playing of the first content,
based on determining to resume the playing of the first content, resume the playing of the first content after an end of the duration of the operation corresponding to the event, and
based on determining not to resume the playing of the first content, stop the playing of the first content after the end of the duration of the operation corresponding to the event.

2. The electronic device of claim 1, wherein the instructions, when executed by the one or more processors individually or collectively, further cause the electronic device to:
determine whether the duration of the event is greater than or equal to the specified amount of time,
based on determining that the duration of the event is less than the specified amount of time, determine to resume the playing of the first content, and
based on determining that the duration of the event is greater than or equal to the specified amount of time, determine not to resume the playing of the first content.

3. The electronic device of claim 2, wherein the specified amount of time is set to a specific amount of time or is set based on a content-related application usage pattern of a user of the electronic device.

4. The electronic device of claim 3, wherein the instructions, when executed by the one or more processors individually or collectively, further cause the electronic device to:
measure a time from a time point when deviating from a first application for playing the first content and executing the operation corresponding to the event using a second application to a time point when returning to the first application and resuming the playing of the first content to obtain time data, and
based on the obtained time data, set the specified amount of time.

5. The electronic device of claim 3, wherein the instructions, when executed by the one or more processors individually or collectively, further cause the electronic device to:
identify a first application for playing the first content and a second application for executing the operation corresponding to the event while playing the first content, and
based on a combination of the identified first application and the identified second application, set the specified amount of time.

6. The electronic device of claim 1, wherein the instructions, when executed by the one or more processors individually or collectively, further cause the electronic device to:
identify whether an execution screen of a first application for playing the first content and an execution screen of a second application for executing the operation corresponding to the event are output as a multi-window, and
based on identifying that the execution screen of the first application and the execution screen of the second application are output as the multi-window, resume the playing of the first content in response to identifying the end of the duration of the operation corresponding to the event.

7. The electronic device of claim 1, wherein the instructions, when executed by the one or more processors individually or collectively, further cause the electronic device to:
identify a type of a first application for executing the first content and a type of a second application for executing the second content, and
based on identifying that the type of the first application and the type of the second application are a same type of application, stop the playing of the first content.

8. The electronic device of claim 7, wherein the instructions, when executed by the one or more processors individually or collectively, further cause the electronic device to:
based on identifying that the type of the second application is a message application, resume the playing of the first content in response to identifying the end of the duration of the operation corresponding to the event.

9. The electronic device of claim 1, wherein the instructions, when executed by the one or more processors individually or collectively, further cause the electronic device to:
identify whether a specified condition associated with a behavior pattern of a user of the electronic device is met, and
based on identifying that the specified condition is met, play content corresponding to the specified condition.

10. A method performed by an electronic device, the method comprising:
in response to identifying an occurrence of an event associated with second content while playing first content using at least one of a display or a speaker, pausing, by the electronic device, the playing of the first content and executing, by the electronic device, an operation corresponding to the event while the playing of the first content is paused, the operation corresponding to the event being executed by using at least one of the display, the speaker, or a microphone;
based on a result of comparing a duration of the operation corresponding to the event and a specified amount of time, determining, by the electronic device, whether to resume the playing of the first content;
based on determining to resume the playing of the first content, resuming, by the electronic device, the playing of the first content in response to identifying an end of the duration of the operation corresponding to the event; and
based on determining not to resume the playing of the first content, stopping, by the electronic device, the playing of the first content after the end of the duration of the operation corresponding to the event.

11. The method of claim 10, further comprising:
determining, by the electronic device, whether the duration of the event is greater than or equal to the specified amount of time;
based on determining that the duration of the event is less than the specified amount of time, determining, by the electronic device, to resume the playing of the first content; and
based on determining that the duration of the event is greater than or equal to the specified amount of time, determining, by the electronic device, not to resume the playing of the first content.

12. The method of claim 11, wherein the specified amount of time is set to a specific amount of time or is set based on a content-related application usage pattern of a user of the electronic device.

13. The method of claim 12, further comprising:
measuring, by the electronic device, a time from a time point when deviating from a first application for the playing of the first content;
executing, by the electronic device, the operation corresponding to the event using a second application to a time point of returning to the first application;
resuming, by the electronic device, the playing of the first content to obtain time data; and
based on the obtained time data, setting, by the electronic device, the specified amount of time.

14. The method of claim 12, further comprising:
identifying, by the electronic device, a first application for playing the first content and a second application for executing the operation corresponding to the event while playing the first content; and
based on a combination of the identified first application and the identified second application, setting, by the electronic device, the specified amount of time.

15. The method of claim 10, further comprising:
identifying, by the electronic device, whether an execution screen of a first application for playing the first content and an execution screen of a second application for executing the operation corresponding to the event are output as a multi-window; and
based on identifying that the execution screen of the first application and the execution screen of the second application are output as the multi-window, resuming, by the electronic device, the playing of the first content in response to identifying the end of the duration of the operation corresponding to the event.

16. The method of claim 10, further comprising:
identifying, by the electronic device, a type of a first application for executing the first content and a type of application for executing the second content; and
based on identifying that the type of the first application and the type of the second application are a same type of application, stopping, by the electronic device, the playing of the first content.

17. The method of claim 16, further comprising:
based on identifying that the type of the second application is a message application, resuming, by the electronic device, the playing of the first content in response to identifying the end of the duration of the operation corresponding to the event.

18. The method of claim 10, further comprising:
identifying, by the electronic device, whether a specified condition associated with a behavior pattern of a user of the electronic device is met; and
based on identifying that the specified condition is met, playing, by the electronic device, content corresponding to the specified condition.

* * * * *